(12) United States Patent
Kato

(10) Patent No.: US 11,797,642 B2
(45) Date of Patent: Oct. 24, 2023

(54) INFORMATION PROCESSING DEVICE, INFORMATION PROCESSING SYSTEM, AND INFORMATION PROCESSING METHOD

(71) Applicant: FUJITSU LIMITED, Kawasaki (JP)

(72) Inventor: Jun Kato, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 231 days.

(21) Appl. No.: 17/489,842

(22) Filed: Sep. 30, 2021

(65) Prior Publication Data

US 2022/0222314 A1 Jul. 14, 2022

(30) Foreign Application Priority Data

Jan. 8, 2021 (JP) ................................ 2021-001871

(51) Int. Cl.
*G06F 17/15* (2006.01)
*G06F 7/57* (2006.01)

(52) U.S. Cl.
CPC ............. *G06F 17/15* (2013.01); *G06F 7/57* (2013.01)

(58) Field of Classification Search
CPC ... G06F 17/15; G06F 7/57; G06F 9/50; G06F 9/5027; G06F 9/505; G06F 9/5083; H04L 47/10; H04L 47/11; H04L 47/12; H04L 47/127; H04L 47/24; H04L 47/26;
(Continued)

(56) References Cited

U.S. PATENT DOCUMENTS

2011/0026401 A1* 2/2011 Wakuda ............... H04L 65/80
370/235
2017/0344365 A1* 11/2017 Nakamoto ............ G06F 9/3001
(Continued)

FOREIGN PATENT DOCUMENTS

JP 2012-073660 A 4/2012

OTHER PUBLICATIONS

Junaid Khalid et al., "Iron: Isolating Network-based CPU in Container Environments", The Proceedings of the 15th USENIX Symposium on Networked Systems Design and Implementation (NSDI '18), USENIX The Advanced Computing Systems Association, pp. 313-328, Apr. 2018 (Total 17 pages).
(Continued)

*Primary Examiner* — Emily E Larocque
(74) *Attorney, Agent, or Firm* — Fujitsu Patent Center

(57) ABSTRACT

A storage circuit stores a first correlation of each program between a transmission rate of information transmitted by each program and a usage rate of an arithmetic processing circuit for each program obtained from statistical information regarding the usage rate, the transmission rate, and a reception rate of information received by each program, and a second correlation of each program between the reception rate and the usage rate. The arithmetic processing circuit converts a guaranteed transmission rate obtained from a desired transmission rate into a first usage rate based on the first correlation, converts a guaranteed reception rate obtained from a desired reception rate into a second usage rate based on the second correlation, designates a target usage rate using a desired usage rate, the first and second usage rate; and allocates the target usage rate to each program.

7 Claims, 22 Drawing Sheets

(58) Field of Classification Search
CPC ... H04L 47/263; H04L 47/62; H04L 47/6215; H04L 47/76; H04L 47/78–788
See application file for complete search history.

(56) References Cited

U.S. PATENT DOCUMENTS

2019/0058666 A1\* 2/2019 Pudlewski ............. H04L 47/27
2021/0158248 A1\* 5/2021 Uenishi .................. G06F 7/575

OTHER PUBLICATIONS

Muhammad Faisal Iqbal et al., "Efficient Prediction of Network Traffic for Real-Time Applications", Hindawi, Journal of Computer Networks and Communications, vol. 2019, Article ID 4067135, pp. 1-11, 2019 (Total 12 pages).

\* cited by examiner

FIG. 5

| PRIMARY ITEM | SECONDARY ITEM | AP1 | AP2 | AP3 | ... | APN |
|---|---|---|---|---|---|---|
| QoS INFORMATION | DESIRED CPU USAGE RATE C1(i) [%] | 30 | - | - | ... | 10 |
| | DESIRED TRANSMISSION RATE S1(i) [Mpps] | - | 1 | - | ... | 1 |
| | DESIRED RECEPTION RATE R1(i) [Mpps] | - | - | 1 | ... | 1 |
| STATISTICAL INFORMATION | TOTAL CPU USAGE RATE C(i) [%] | 30 | 5.9 | 6.1 | ... | 30 |
| | TRANSMISSION CPU USAGE RATE C(i, TX) [%] | 0 | 0.6 | 0.7 | ... | 10 |
| | RECEPTION CPU USAGE RATE C(i, RX) [%] | 0 | 0.3 | 0.4 | ... | 10 |
| | TRANSMISSION RATE (in) [Mpps] | 0 | 0.6 | 0.2 | ... | 1 |
| | RECEPTION RATE (in) [Mpps] | 0 | 0.3 | 1.5 | ... | 1 |
| | TRANSMISSION RATE (out) [Mpps] | 0 | 0.6 | 0.2 | ... | 1 |
| | RECEPTION RATE (out) [Mpps] | 0 | 0.3 | 1.5 | ... | 1 |

FIG. 6

| PRIMARY ITEM | SECONDARY ITEM | AP1 | AP2 | AP3 | ... | APN |
|---|---|---|---|---|---|---|
| QoS INFORMATION | DESIRED CPU USAGE RATE $C1(i)$ [%] | 30 | - | - | ... | 10 |
| | DESIRED TRANSMISSION RATE $S1(i)$ [Mpps] | - | 1 | - | ... | 1 |
| | DESIRED RECEPTION RATE $R1(i)$ [Mpps] | - | - | 1 | ... | 1 |
| GENERATED INFORMATION | PREDICTED TRANSMISSION RATE $S2(i)$ [Mpps] | 0 | 0.6 | 0.2 | ... | 0.8 |
| | PREDICTED RECEPTION RATE $R2(i)$ [Mpps] | 0 | 0.3 | 1.5 | ... | 0.9 |
| | TRANSMISSION RATE CONVERSION FORMULA $f1(i)$ [Mpps TO %] | f1(1) | f1(2) | f1(3) | ... | f1(N) |
| | RECEPTION RATE CONVERSION FORMULA $f2(i)$ [Mpps TO %] | f2(1) | f2(2) | f2(3) | ... | f2(N) |

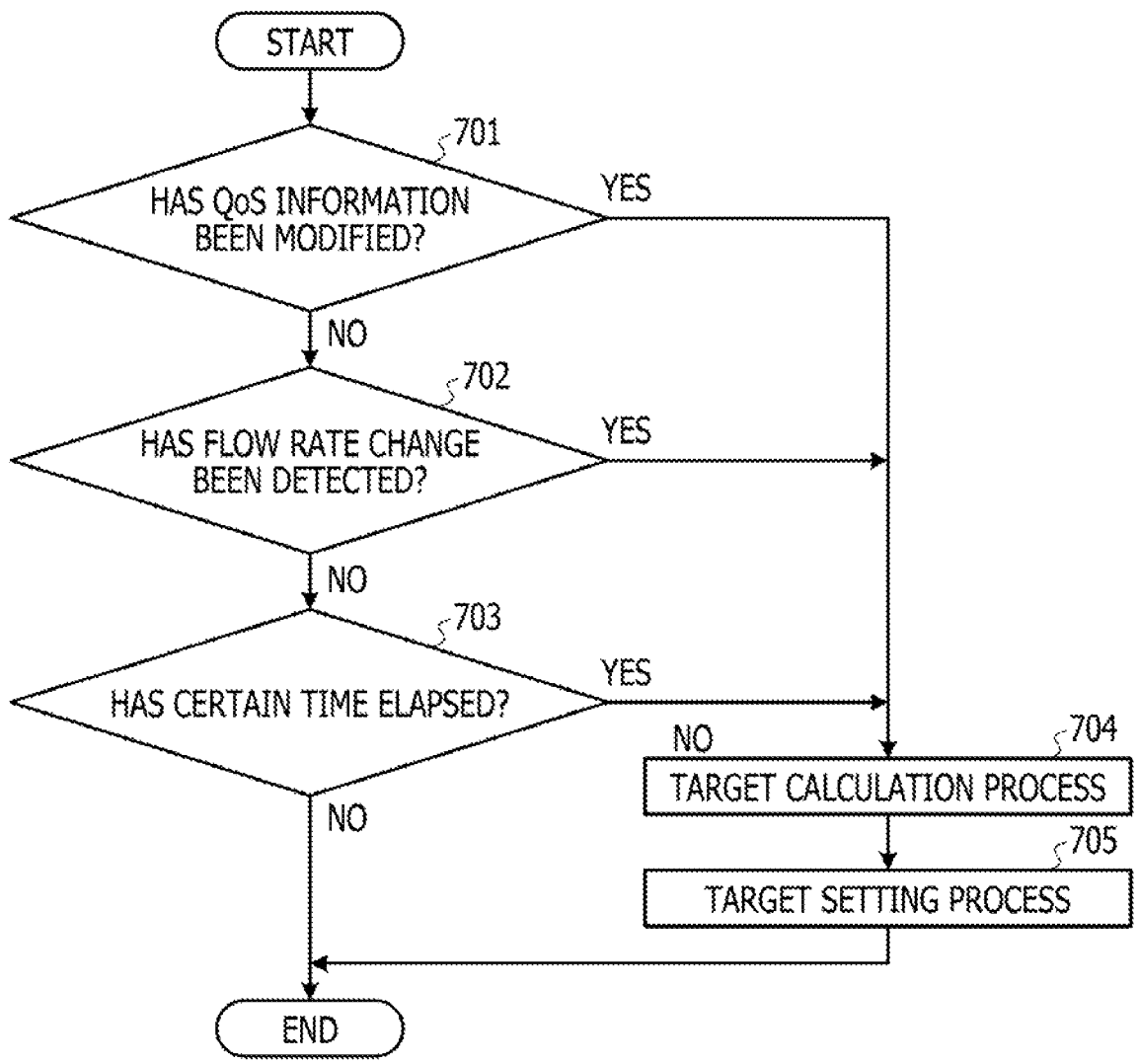

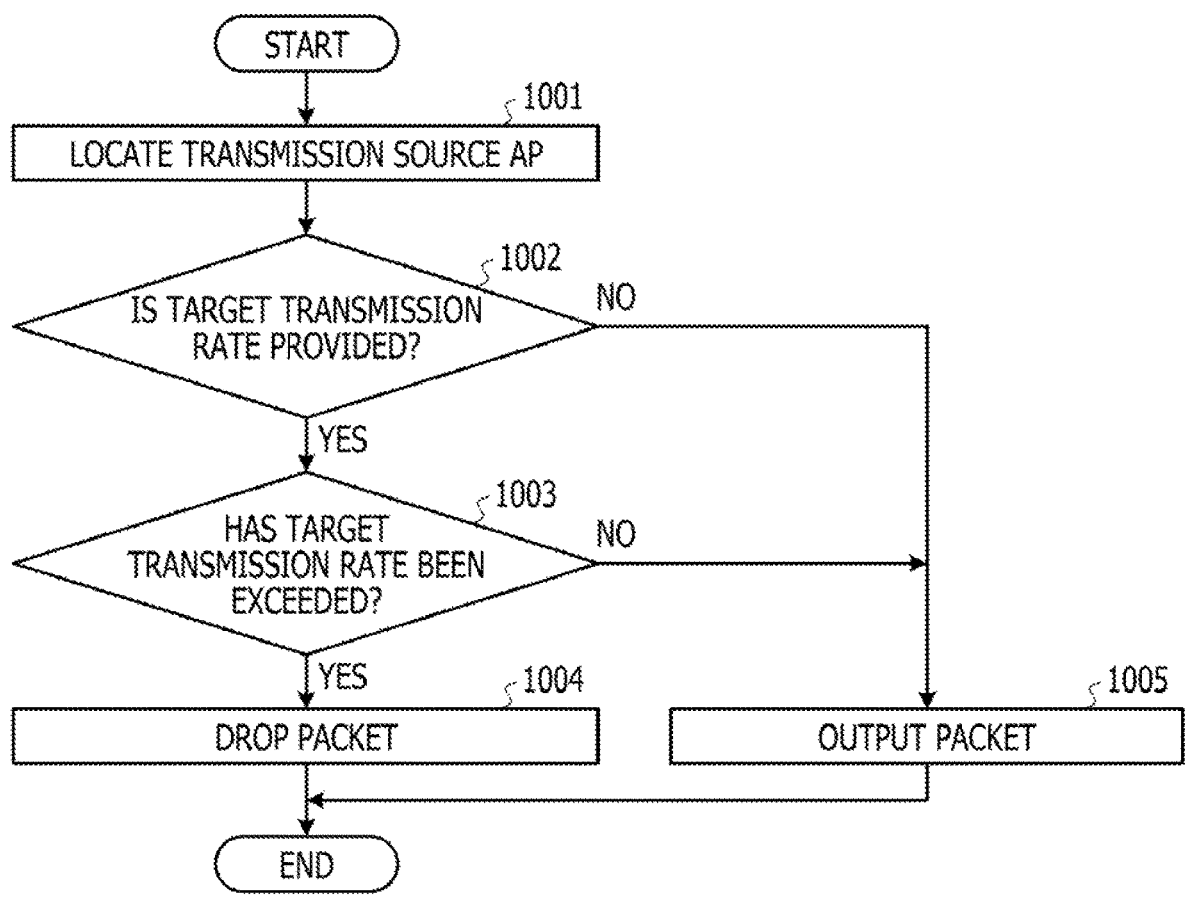

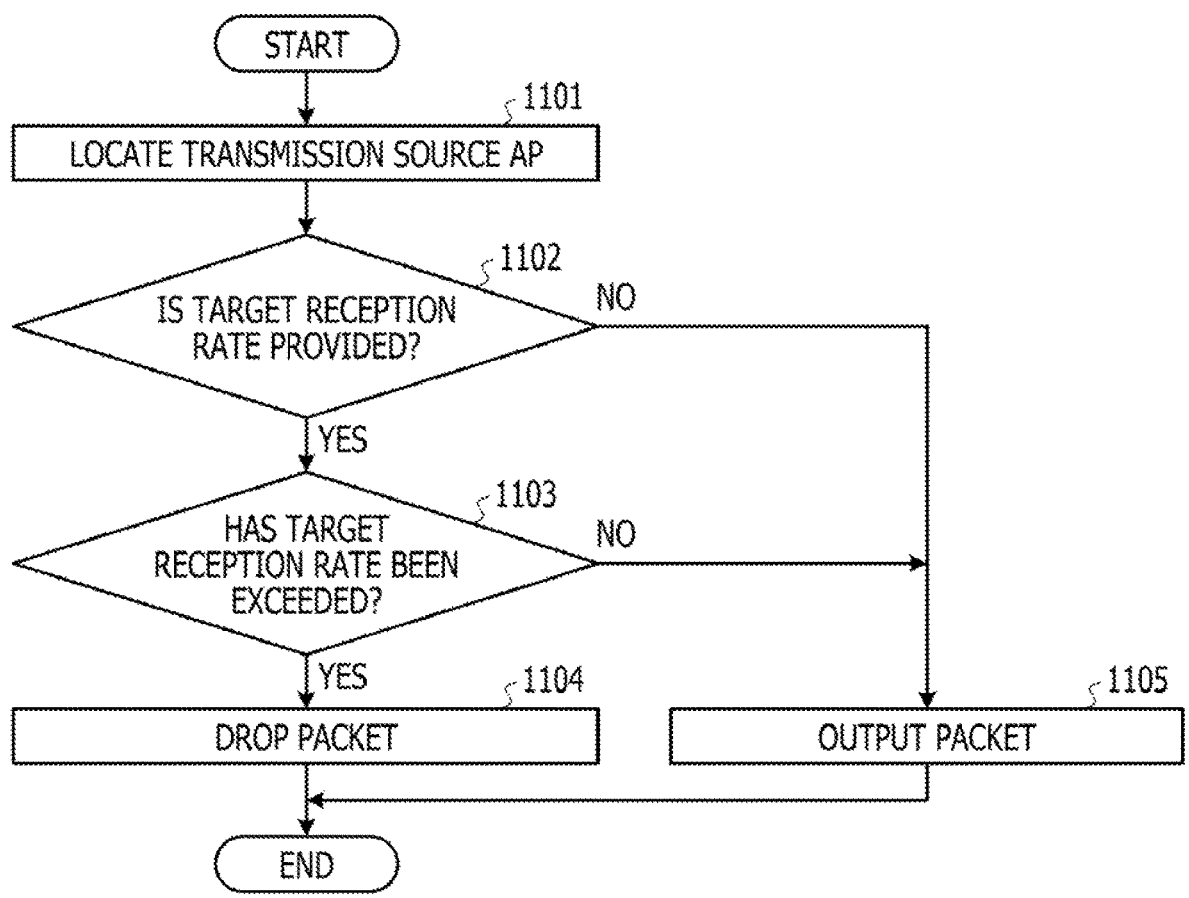

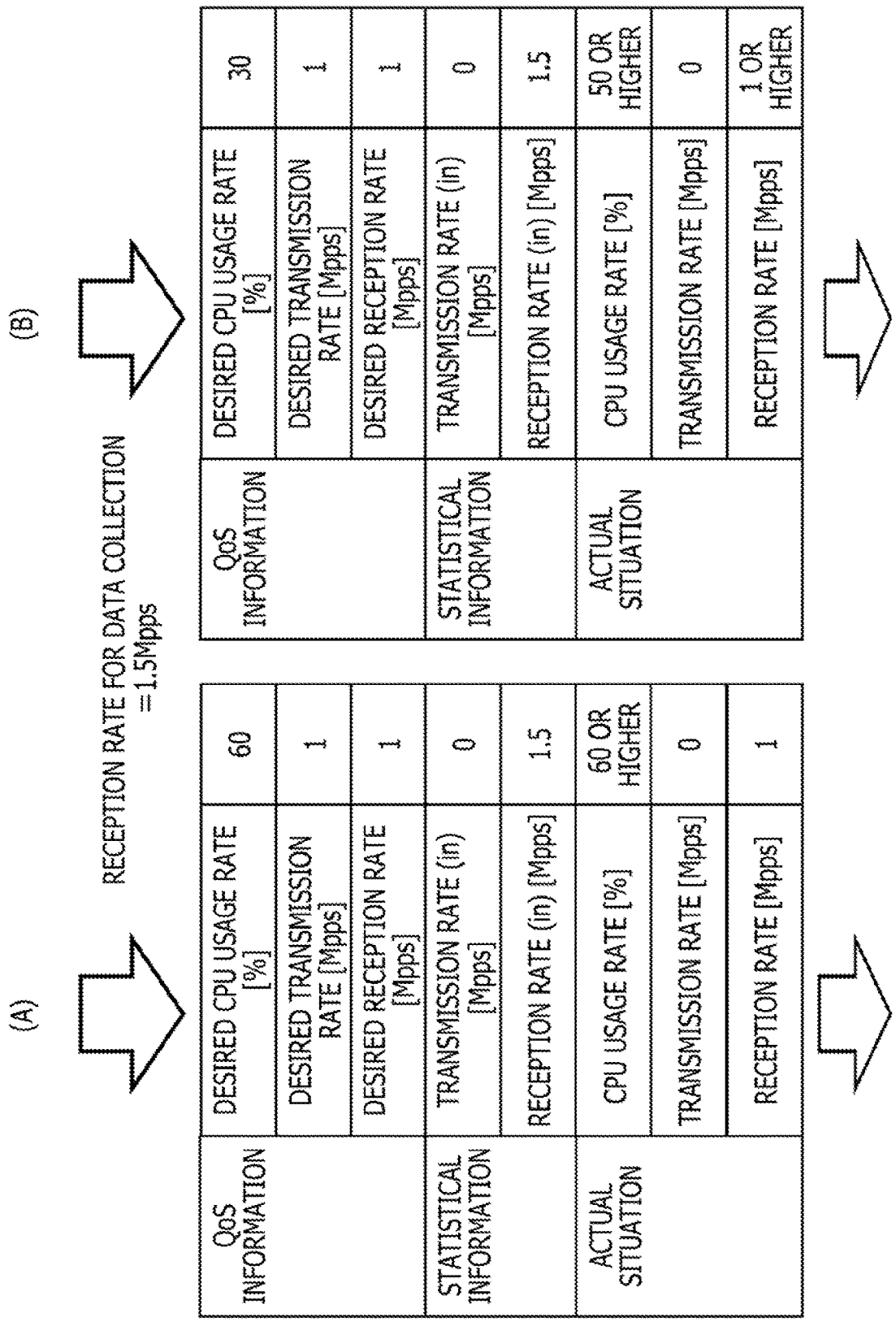

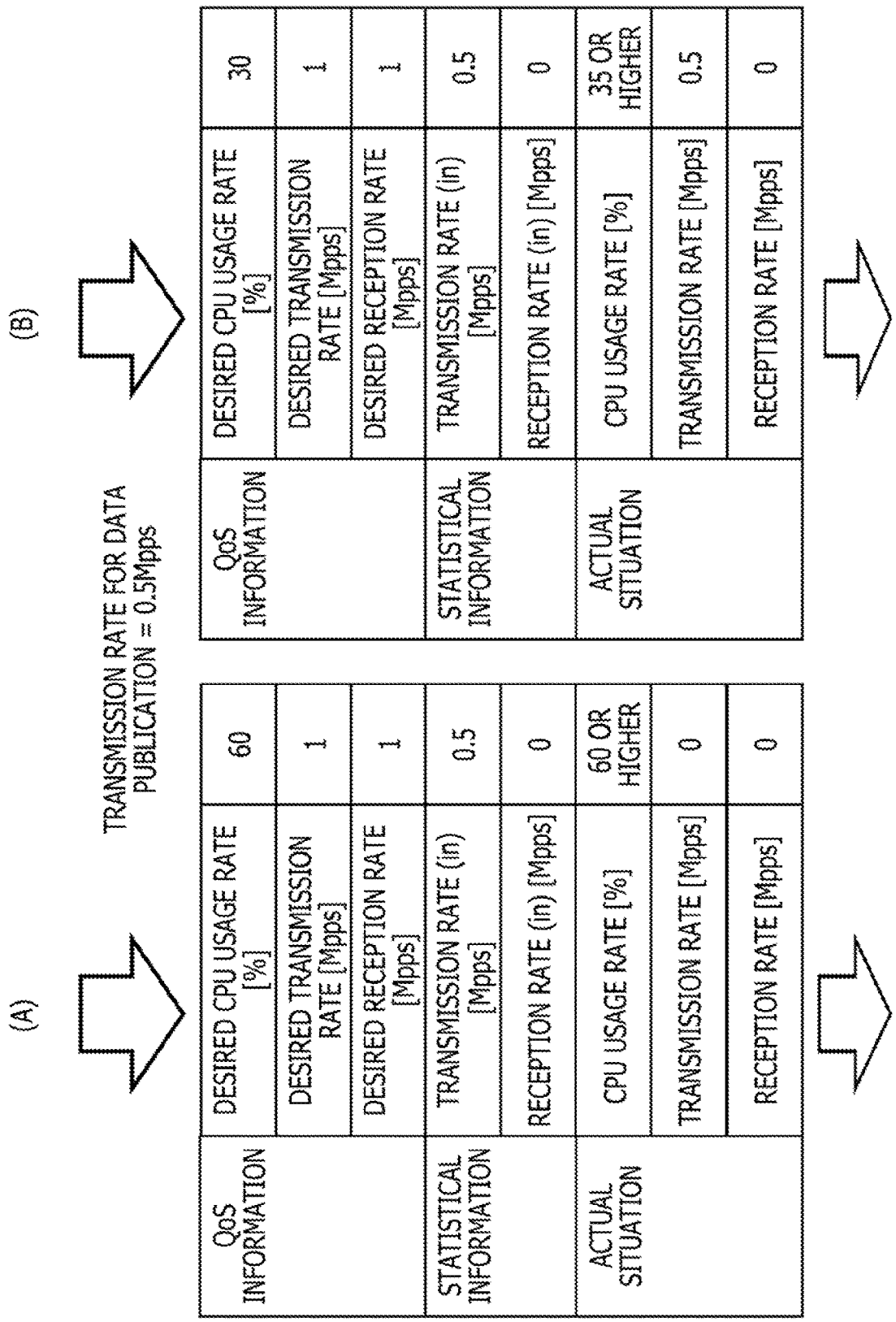

FIG. 13

| PRIMARY ITEM | SECONDARY ITEM | AP1 | AP2 | AP3 |
|---|---|---|---|---|
| QoS INFORMATION | DESIRED CPU USAGE RATE [%] | 20 | 30 | 50 |
| | DESIRED TRANSMISSION RATE [Mpps] | - | 1 | 1 |
| | DESIRED RECEPTION RATE [Mpps] | - | 1 | 1 |
| STATISTICAL INFORMATION | TRANSMISSION RATE (in) [Mpps] | 0 | 0.5 | 1.5 |
| | RECEPTION RATE (in) [Mpps] | 0 | 0.5 | 1.5 |
| ACTUAL SITUATION | CPU USAGE RATE [%] | 20 | 30 | 50 |
| | TRANSMISSION RATE [Mpps] | 0 | 0.5 | 1 |
| | RECEPTION RATE [Mpps] | 0 | 0.5 | 1 |

FIG. 14

| PRIMARY ITEM | SECONDARY ITEM | AP1 | AP2 | AP3 |
|---|---|---|---|---|
| QoS INFORMATION | DESIRED CPU USAGE RATE [%] | 20 | - | 20 |
| | DESIRED TRANSMISSION RATE [Mpps] | - | 1 | 1 |
| | DESIRED RECEPTION RATE [Mpps] | - | 1 | 1 |
| STATISTICAL INFORMATION | TRANSMISSION RATE (in) [Mpps] | 0 | 0.5 | 1.5 |
| | RECEPTION RATE (in) [Mpps] | 0 | 0.5 | 1.5 |
| ACTUAL SITUATION | CPU USAGE RATE [%] | 20 OR HIGHER | 15 | 50 OR HIGHER |
| | TRANSMISSION RATE [Mpps] | 0 | 0.5 OR HIGHER | 1 OR HIGHER |
| | RECEPTION RATE [Mpps] | 0 | 0.5 | 1 OR HIGHER |

INFORMATION PROCESSING DEVICE, INFORMATION PROCESSING SYSTEM, AND INFORMATION PROCESSING METHOD

CROSS-REFERENCE TO RELATED APPLICATION

This application is based upon and claims the benefit of priority of the prior Japanese Patent Application No. 2021-1871, filed on Jan. 8, 2021, the entire contents of which are incorporated herein by reference.

FIELD

The embodiments discussed herein are related to information processing.

BACKGROUND

A technique for isolating a network type central processing unit (CPU) in a container environment is known. A container having heavily loaded network traffic sometimes reduces calculating resources available to the other containers sharing the same server.

An input/output (I/O) adapter control method for computing calculator resources of a virtual calculator that processes I/O based on a quality of service (QoS) policy is also known. Effective methods for predicting network traffic are also known.

Examples of the related art include as follows: Japanese Laid-open Patent Publication No. 2012-73660; Junaid Khalid et al., "Iron: Isolating Network-based CPU in Container Environments", Proceedings of the 15th USENIX Symposium on Networked Systems Design and Implementation (NSDI '18), pages 313-328, 2018; and Muhammad Faisal Iqbal et al., "Efficient Prediction of Network Traffic for Real-Time Applications", Hindawi, *Journal of Computer Networks and Communications*, Volume 2019, Article ID 4067135, 11 pages, 2019.

SUMMARY

According to an aspect of the embodiments, an information processing device includes an arithmetic processing circuit configured to execute a plurality of programs, and a storage circuit configured to store a first correlation of each of the plurality of programs between a transmission rate of information transmitted by each of the plurality of programs and a usage rate of the arithmetic processing circuit for each of the plurality of programs obtained from statistical information regarding the usage rate, the transmission rate, and a reception rate of information received by each of the plurality of programs, and a second correlation of each of the plurality of programs between the reception rate and the usage rate obtained from the statistical information, wherein the arithmetic processing circuit is configured to perform processing. In an example, the processing includes receiving a desired usage rate for each of the plurality of programs, a desired transmission rate for each of the plurality of programs, and a desired reception rate for each of the plurality of programs, executing a designation processing that includes obtaining a guaranteed transmission rate from the desired transmission rate, obtaining a guaranteed reception rate from the desired reception rate, converting the guaranteed transmission rate into a first usage rate based on the first correlation, converting the guaranteed reception rate into a second usage rate based on the second correlation, and designating a target usage rate using the desired usage rate, the first usage rate, and the second usage rate, and executing an allocation processing that includes allocating the target usage rate of each of the plurality of programs to each of the plurality of programs.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram illustrating QoS information and statistical information;

FIG. 6 is a diagram illustrating information generated from the statistical information;

FIG. 7 is a flowchart of a target update process;

FIG. 10 is a flowchart of a transmission rate control process;

FIG. 11 is a flowchart of a reception rate control process;

FIG. 12D is a diagram (part 4) illustrating first information processing and second information processing;

FIG. 12F is a diagram (part 6) illustrating first information processing and second information processing;

FIG. 13 is a diagram illustrating third information processing;

FIG. 14 is a diagram illustrating fourth information processing; and

DESCRIPTION OF EMBODIMENTS

Figure 1:
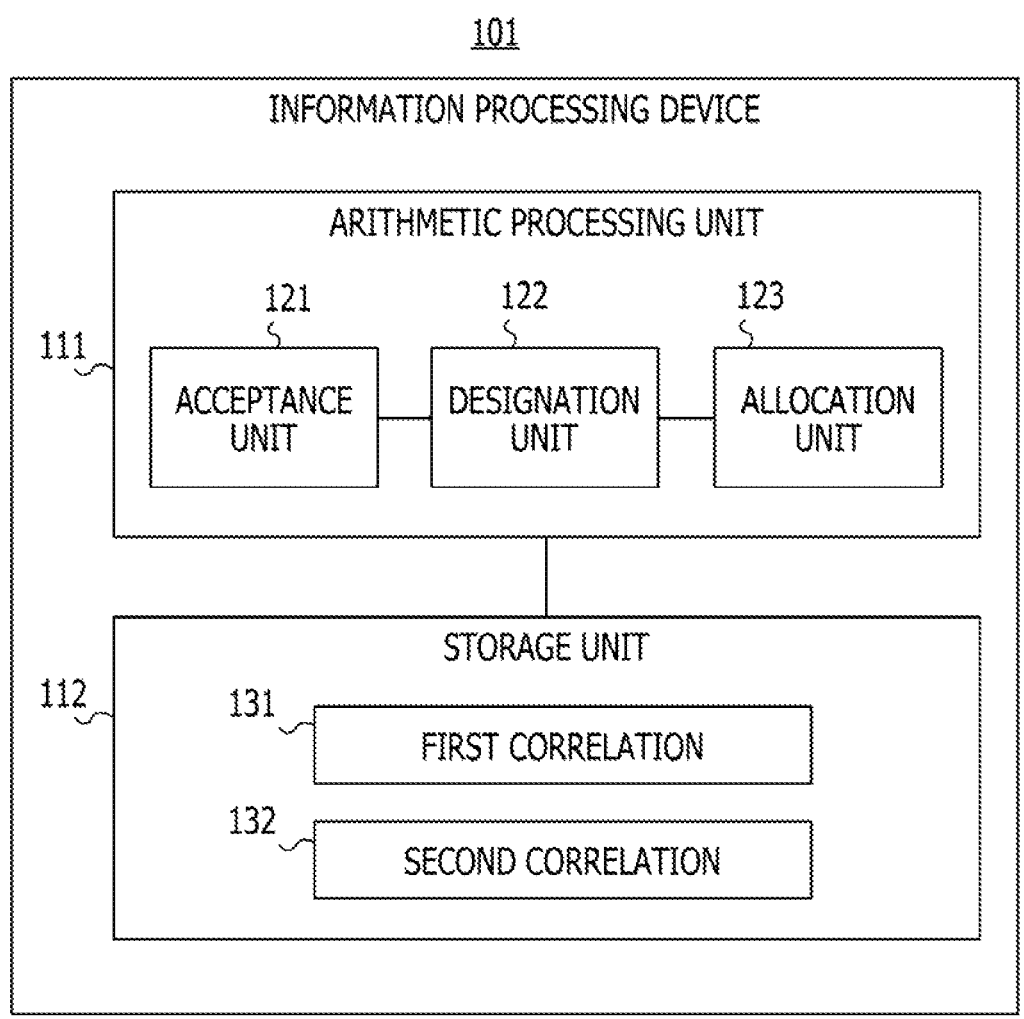
FIG. 1 is a functional configuration diagram of an information processing device.

As disclosed in "Iron: Isolating Network-based CPU in Container Environments", interrupt processing associated with packet transmission and reception is sometimes erroneously counted as CPU processing of an application program (AP) operating at the time of transmission or reception. For example, there is a case where the processing time of interrupt processing by another AP takes up nearly 60% of the processing time of an AP with a high CPU usage rate. In this case, the CPU usage rate of each AP can be adapted by counting the interrupt processing as the CPU processing of an AP that is the transmission source or destination of the packet.

As described above, when QoS of a communication network is examined, not only the communication rate of packets but also the CPU usage rate occurring in association with interrupt processing for transmission and reception has begun to be considered.

When QoS for a communication network is implemented, computer resources are controlled in accordance with QoS set by a user. The computer resources include CPU resources and network resources. The CPU resource denotes, for example, the CPU usage rate, and the network resource denotes, for example, the communication rate of the network. Since packet communication includes two-way communication of transmission and reception, the transmission rate and the reception rate are individually set as the communication rate of the network.

However, the network processing performed by the AP to transmit or receive packets also includes interrupt processing for transmission or reception. It is difficult for the user to estimate the CPU usage rate for network processing while considering the operation of the operating system (OS), such as interrupt processing. Moreover, even if the flow rates of the transmitted and received packets are the same, the CPU usage rate for network processing varies depending on the packet processing route. Therefore, the CPU usage rate of the AP set by the user becomes excessive in some cases.

Note that such a problem arises in an information processing device (computer) that executes various programs, as well as in a server on which a container is mounted. Furthermore, such a problem arises in the control of resources of arithmetic processing unit, as well as in the control of CPU resources.

In one aspect, it is an object of the present embodiments to effectively utilize resources of an arithmetic processing unit in an information processing device in which the resources are allocated to each of a plurality of programs executed by the arithmetic processing unit.

Hereinafter, embodiments will be described in detail with reference to the drawings.

When 70% is set as the CPU usage rate of an AP in QoS settings of a communication network, the CPU usage rate is controlled such that the AP uses the CPU only up to 700 milliseconds in one second.

When 1 mega packets per second (Mpps) is set as the transmission rate of an AP, the transmission rate is controlled such that the transmission rate of packets transmitted by the AP at least coincides with 1 Mpps. In this case, the computer is allowed to throttle or drop the packets by limiting the flow rate when the transmission rate exceeds 1 Mpps.

When 1 Mpps is set as the reception rate of an AP, the reception rate is controlled such that the reception rate of packets received by the AP at least coincides with 1 Mpps. In this case, the computer is allowed to throttle or drop the packets by limiting the flow rate when the reception rate exceeds 1 Mpps. The transmission rate and the reception rate are set using bandwidth instead of the number of packets per second in some cases.

It is assumed that the CPU usage rate for network processing performed by an AP is 10% per 1 Mpps. In this case, in order to guarantee the transmission rate of 1 Mpps and the reception rate of 1 Mpps, the CPU usage rate only needs to be increased by 20%. This allows to control the CPU in consideration of the CPU usage rate for network processing.

However, it is difficult for the user to estimate the CPU usage rate for network processing while considering the operation of the OS, such as interrupt processing. Moreover, even if the flow rates of the transmitted and received packets are the same, the CPU usage rate for network processing varies depending on the packet processing route.

For example, transmission control protocol (TCP) and user datagram protocol (UDP) have completely different CPU loads for protocol processing. Furthermore, when the flow rate of the transmitted packets is limited, processing of waiting for transmission and resuming the transmission is added. Assuming the CPU usage rate for network processing per 1 Mpps is convenient for explanation, but it is not suitable for real network processing in some cases.

The CPU usage rate allocated to the AP to guarantee QoS is not used for network processing unless packet transmission or reception occurs. Therefore, unless a benchmark AP or the like that regularly performs both of transmission and reception is concerned, the allocated CPU usage rate becomes excessive in some cases depending on the packet flow rate. Accordingly, it is desirable to modify the CPU usage rate allocated to guarantee the transmission rate and the reception rate according to the packet flow rate.

Furthermore, when the flow rate is limited based on the statically set transmission rate and reception rate, packets are throttled or dropped in some cases even if the CPU usage rate has an unused portion. In this case, it is desirable to use a CPU usage rate that is a surplus for network processing.

FIG. 1 illustrates a functional configuration example of an information processing device according to an embodiment. The information processing device 101 in FIG. 1 includes an arithmetic processing unit 111 that execute a plurality of programs and a storage unit 112.

The storage unit 112 stores a first correlation 131 between the transmission rate and the usage rate of each program and a second correlation 132 between the reception rate and the usage rate of each program. The first correlation 131 and the second correlation 132 are worked out from statistical information regarding the usage rate of the arithmetic processing unit 111 for each program, the transmission rate of information transmitted by each program, and the reception rate of information received by each program.

The arithmetic processing unit 111 includes an acceptance unit 121, a designation unit 122, and an allocation unit 123 and performs information processing using the first correlation 131 and the second correlation 132.

Figure 2:
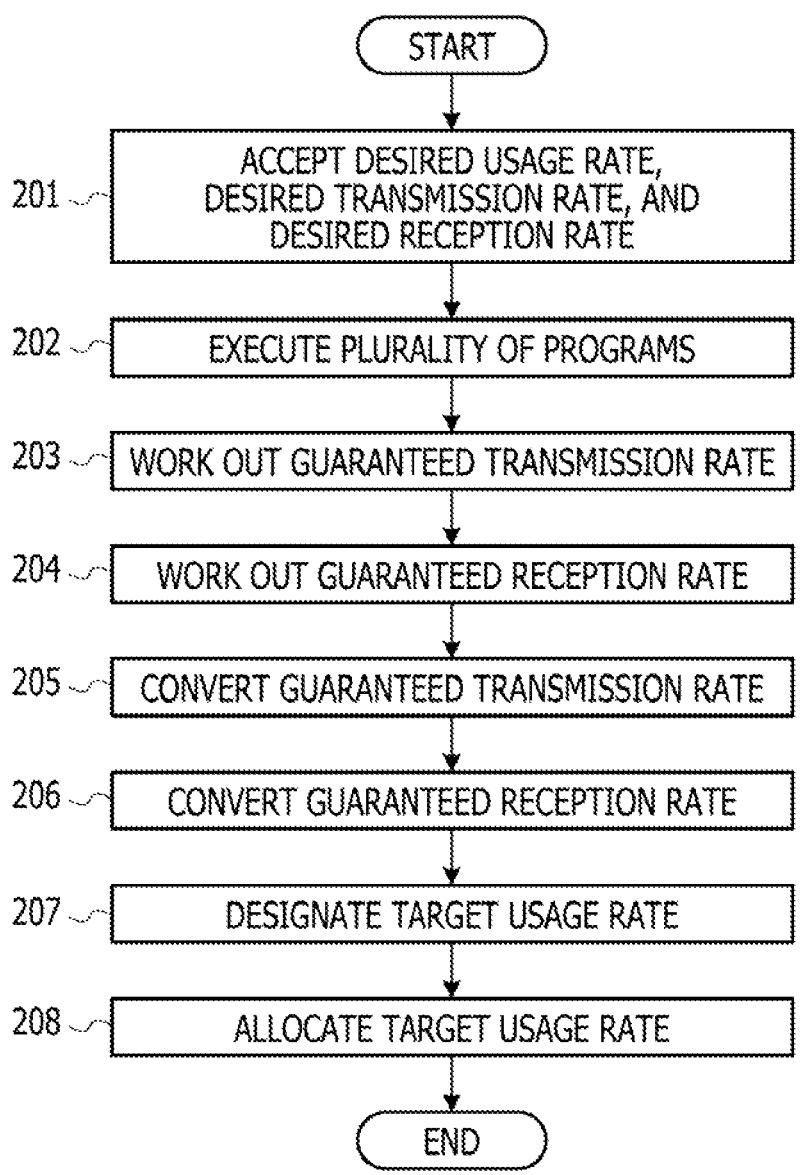
FIG. 2 is a flowchart of information processing.

FIG. 2 is a flowchart illustrating an example of information processing performed by the information processing device 101 in FIG. 1. First, the acceptance unit 121 accepts a desired usage rate for each program, a desired transmission rate for each program, and a desired reception rate for each program (step 201). Then, the arithmetic processing unit 111 executes a plurality of programs (step 202).

Next, the designation unit 122 works out a guaranteed transmission rate from the desired transmission rate (step 203) and works out a guaranteed reception rate from the desired reception rate (step 204). Then, the designation unit 122 converts the guaranteed transmission rate into a first usage rate based on the first correlation 131 (step 205) and converts the guaranteed reception rate into a second usage rate based on the second correlation (step 206).

Next, the designation unit 122 designates a target usage rate using the desired usage rate, the first usage rate, and the second usage rate (step 207). Then, the allocation unit 123 allocates the target usage rate of each program to each program (step 208).

According to the information processing device 101 in FIG. 1, the resources of the arithmetic processing unit 111 may be effectively utilized.

Figure 3:
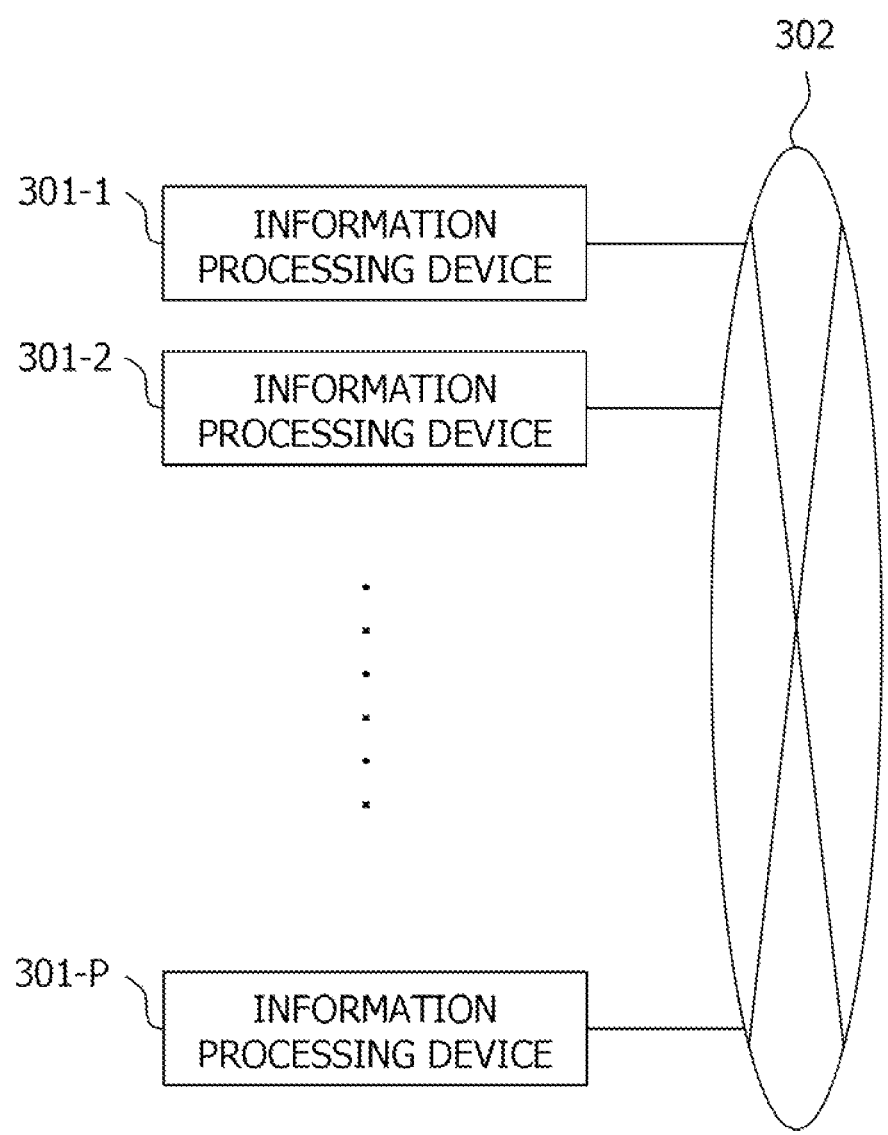
FIG. 3 is a configuration diagram of an information processing system.

FIG. 3 illustrates a configuration example of an information processing system including the information processing device 101 in FIG. 1. The information processing system in FIG. 3 includes information processing devices 301-1 to 301-P (P is an integer equal to or greater than two). Each information processing device 301-$p$ (p=1 to P) corresponds to the information processing device 101 in FIG. 1.

The information processing devices 301-1 to 301-P are capable of communicating with each other via a communication network 302. The communication network 302 is a local area network (LAN) or a wide area network (WAN).

Figure 4:
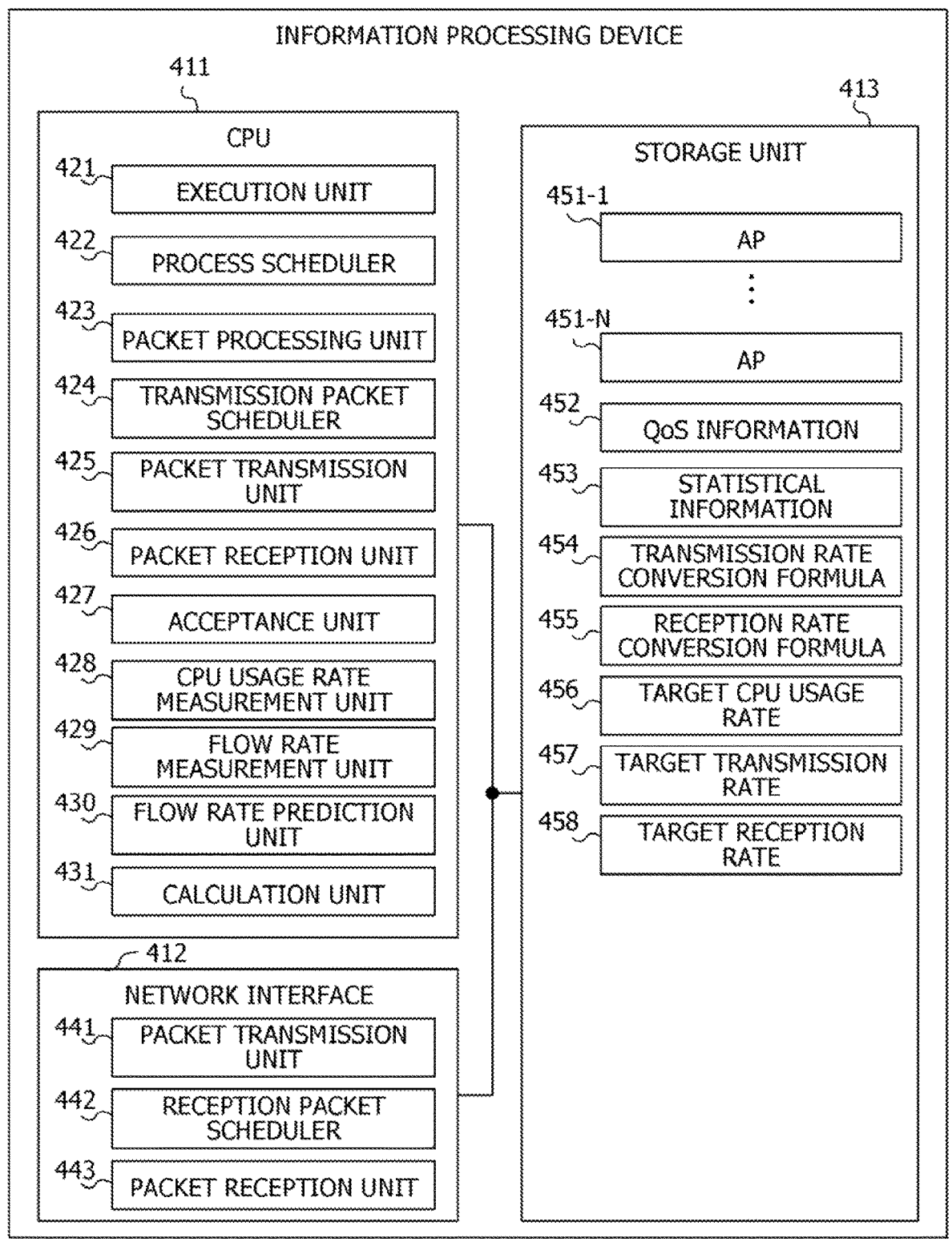
FIG. 4 is a functional configuration diagram of an information processing device included in the information processing system.

FIG. 4 illustrates a functional configuration example of the information processing device 301-$p$ in FIG. 3. The information processing device 301-$p$ in FIG. 4 includes a CPU 411, a network interface 412, and a storage unit 413. The CPU 411 is sometimes called a processor.

The storage unit 413 stores APs 451-1 to 451-N (N is an integer equal to or greater than one), and a target CPU usage rate 456, a target transmission rate 457, and a target reception rate 458 of each AP 451-$i$ (i=1 to N). The APs 451-1 to 451-N are an example of a plurality of programs.

The CPU 411 includes an execution unit 421, a process scheduler 422, a packet processing unit 423, a transmission packet scheduler 424, a packet transmission unit 425, and a packet reception unit 426. The CPU 411 further includes an acceptance unit 427, a CPU usage rate measurement unit 428, a flow rate measurement unit 429, a flow rate prediction unit 430, and a calculation unit 431.

The network interface 412 includes a packet transmission unit 441, a reception packet scheduler 442, and a packet reception unit 443.

The CPU 411 corresponds to the arithmetic processing unit 111, and the storage unit 413 corresponds to the storage unit 112 in FIG. 1. The acceptance unit 427 corresponds to the acceptance unit 121, the flow rate prediction unit 430 and the calculation unit 431 correspond to the designation unit 122, and the process scheduler 422 corresponds to the allocation unit 123.

The CPU usage rate measurement unit 428 and the flow rate measurement unit 429 are an example of an acquisition unit, the transmission packet scheduler 424 is an example of a transmission control unit, and the reception packet scheduler 442 is an example of a reception control unit.

The execution unit 421 executes the APs 451-1 to 451-N. The process scheduler 422 controls the operation of each AP 451-$i$ by allocating the target CPU usage rate 456 of each AP 451-$i$ to each AP 451-$i$. The CPU usage rate corresponds to the usage rate of the arithmetic processing unit 111, and the target CPU usage rate 456 corresponds to the target usage rate.

When transmitting transmission data to another information processing device 301-$p$, the AP 451-$i$ outputs the transmission data to the packet processing unit 423. The packet processing unit 423 performs packet processing on the transmission data output from the AP 451-$i$ and outputs a packet containing the transmission data to the transmission packet scheduler 424. The packet containing the transmission data is an example of information transmitted by the AP 451-$i$.

The transmission packet scheduler 424 outputs the packet output from the packet processing unit 423 to the packet transmission unit 425. At this time, the transmission packet scheduler 424 controls the transmission rate of the packet by adjusting the flow rate of the packet to be output, based on the target transmission rate 457.

The packet transmission unit 425 outputs the packet output from the transmission packet scheduler 424 to the network interface 412. The packet transmission unit 441 transmits the packet output from the CPU 411 to another information processing device 301-$p$.

The packet reception unit 443 receives a packet containing reception data from another information processing device 301-$p$ and outputs the received packet to the reception packet scheduler 442. The packet containing the reception data is an example of information received by the AP 451-$i$.

The reception packet scheduler 442 outputs the packet output from the packet reception unit 443 to the CPU 411. At this time, the reception packet scheduler 442 controls the reception rate of the packet by adjusting the flow rate of the packet to be output, based on the target reception rate 458.

The packet reception unit 426 receives the packet from the network interface 412 and outputs the received packet to the packet processing unit 423. The packet processing unit 423 performs packet processing on the packet output from the packet reception unit 426 to extract the reception data and outputs the extracted reception data to the AP 451-$i$.

The user sets QoS by inputting a desired CPU usage rate $C1(i)$, a desired transmission rate $S1(i)$, and a desired reception rate $R1(i)$ for each AP 451-$i$ to the information processing device 301-$p$. The acceptance unit 427 accepts input $C1(i)$, $S1(i)$, and $R1(i)$ and stores accepted $C1(i)$, $S1(i)$, and $R1(i)$ in the storage unit 413 as QoS information 452. The desired CPU usage rate $C1(i)$ corresponds to the desired usage rate.

The CPU usage rate measurement unit 428 measures the CPU usage rate of each AP 451-$i$ and records the measured CPU usage rate in statistical information 453 in the storage unit 413. The flow rate measurement unit 429 measures the transmission rate of the packet transmitted by each AP 451-$i$ and the reception rate of the packet received by each AP 451-$i$ and records the measured transmission rate and reception rate in the statistical information 453 in the storage unit 413.

The flow rate prediction unit 430 works out a predicted transmission rate and a predicted reception rate of each AP 451-$i$ from the transmission rate and the reception rate recorded in the statistical information 453, respectively.

The calculation unit 431 generates a transmission rate conversion formula 454 and a reception rate conversion formula 455 of each AP 451-$i$ using the statistical information 453 and stores the generated transmission rate conversion formula 454 and reception rate conversion formula 455 in the storage unit 413. The transmission rate conversion formula 454 corresponds to the first correlation 131 and represents the correlation between the transmission rate and the CPU usage rate of each AP 451-$i$. The reception rate conversion formula 455 corresponds to the second correlation 132 and represents the correlation between the reception rate and the CPU usage rate of each AP 451-$i$.

The calculation unit 431 works out the guaranteed transmission rate from the desired transmission rate $S1(i)$ included in the QoS information 452 and works out the guaranteed reception rate from the desired reception rate $R1(i)$ included in the QoS information 452.

The calculation unit 431 uses the transmission rate conversion formula 454 to convert the guaranteed transmission rate to the corresponding CPU usage rate and uses the reception rate conversion formula 455 to convert the guaranteed reception rate to the corresponding CPU usage rate.

The CPU usage rate corresponding to the guaranteed transmission rate corresponds to the first usage rate and represents the CPU usage rate consumed to guarantee the guaranteed transmission rate. The CPU usage rate corresponding to the guaranteed reception rate corresponds to the second usage rate and represents the CPU usage rate consumed to guarantee the guaranteed reception rate.

By using the transmission rate conversion formula 454 and the reception rate conversion formula 455 generated from the statistical information 453, the CPU usage rates corresponding to the guaranteed transmission rate and the guaranteed reception rate of each AP 451-$i$ may be worked out accurately.

The calculation unit 431 calculates the target CPU usage rate 456 of each AP 451-$i$ using the desired CPU usage rate C1($i$) included in the QoS information 452, the CPU usage rate corresponding to the guaranteed transmission rate, and the CPU usage rate corresponding to the guaranteed reception rate and stores the calculated target CPU usage rate 456 in the storage unit 413.

Furthermore, the calculation unit 431 calculates the target transmission rate 457 and the target reception rate 458 of each AP 451-$i$ and stores the calculated target transmission rate 457 and target reception rate 458 in the storage unit 413. To calculate the target transmission rate 457 and the target reception rate 458, C1($i$), S1($i$), R1($i$), the CPU usage rate corresponding to the guaranteed transmission rate, the CPU usage rate corresponding to the guaranteed reception rate, the transmission rate conversion formula 454, and the reception rate conversion formula 455 are used.

The CPU 411 acquires the statistical information 453 at a predetermined opportunity and dynamically modifies the target CPU usage rate 456, the target transmission rate 457, and the target reception rate 458 of each AP 451-$i$ based on the acquired statistical information 453.

According to the information processing device 301-$p$ in FIG. 4, the CPU usage rates for guaranteeing the desired transmission rate S1($i$) and the desired reception rate R1($i$) are automatically calculated and reflected in the target CPU usage rate 456. Therefore, the user may be allowed to set QoS only from the viewpoint of the AP 451-$i$ without estimating the CPU usage rate consumed in network processing.

The CPU usage rate measurement unit 428 measures the execution time of each AP 451-$i$ and calculates a total CPU usage rate C($i$) of each AP 451-$i$ from the measured execution time. The CPU usage rate measurement unit 428 further measures the processing times of the packet processing unit 423, the transmission packet scheduler 424, the packet transmission unit 425, the packet reception unit 426, and the reception packet scheduler 442. Then, the CPU usage rate measurement unit 428 uses the measured processing times to correct C($i$) such that the influence of interrupt processing for packet transmission and reception is reflected.

The CPU usage rate measurement unit 428 may correct the CPU usage rate of each AP 451-$i$ using, for example, the technique of "Iron: Isolating Network-based CPU in Container Environments". In this case, the CPU usage rate measurement unit 428 calculates a transmission CPU usage rate C(i, TX) of the AP 451-$i$ by the following formula.

$$C(i,TX)=(T1(i,TX)+T2(i,TX))/T \quad (1)$$

T1($i$, TX) represents the processing time not related to interrupt processing, T2($i$, TX) represents the processing time related to interrupt processing, and T represents the measurement time elapsed while the processing time is being measured.

T1($i$, TX) denotes the sum of the processing time of the packet processing unit 423, the processing time of the transmission packet scheduler 424, and the processing time of the packet transmission unit 425 when performing packet processing as an extension of transmission processing of the AP 451-$i$. T2($i$, TX) denotes the sum of the processing time for interrupt processing for completed transmission and the processing time of the packet transmission unit 425 when performing packet processing not as an extension of transmission processing of the AP 451-$i$.

Furthermore, the CPU usage rate measurement unit 428 calculates a reception CPU usage rate C(i, RX) of the AP 451-$i$ by the following formula.

$$C(i,RX)=(T1(i,RX)+T2(i,RX))/T \quad (2)$$

T1($i$, RX) represents the processing time not related to interrupt processing, T2($i$, RX) represents the processing time related to interrupt processing, and T represents the measurement time elapsed while the processing time is being measured.

T1($i$, RX) denotes the processing time for processing performed by the packet processing unit 423 other than interrupt processing. T2($i$, RX) denotes the sum of the processing time of the packet reception unit 426 and the processing time for processing performed by the packet processing unit 423 during interrupt processing.

The CPU usage rate measurement unit 428 calculates T1($i$, TX) and T1($i$, RX) by the following formulas.

$$T1(i,TX)=\Sigma_q T1(i,q,TX) \quad (3)$$

$$T1(i,RX)=\Sigma_q T1(i,q,RX) \quad (4)$$

T1($i$, $q$, TX) represents the processing time of the AP 451-$i$ for the q-th transmission processing, and T1($i$, $q$, RX) represents the processing time of the AP 451-$i$ for the q-th reception processing. $\Sigma_q$ in formula (3) represents the total sum for all pieces of transmission processing performed while the processing time is being measured, and $\Sigma_q$ in formula (4) represents the total sum for all pieces of reception processing performed while the processing time is being measured.

The CPU usage rate measurement unit 428 calculates T1($i$, $q$, TX) by the following formula using the technique of "Iron: Isolating Network-based CPU in Container Environments".

$$T1(i,q,TX)=\text{Time\_end}-\text{Time\_start} \quad (5)$$

The element Time_start represents the start time point of the q-th transmission processing, and the element Time_end represents the end time point of the q-th transmission processing. The elements Time_start and Time_end are calculated by the following formula.

$$\text{Time\_X}=\text{cumtime}+(\text{now}-\text{swaptime}) \quad (6)$$

The element Time_X represents the element Time_start or Time_end. The element cumtime represents the cumulative execution time for a thread that performs transmission processing or reception processing, the element now represents the current time point, and the element swaptime represents a time point when the thread began operating most recently. The term now—swaptime represents the execution time that has not yet been counted in the cumulative execution time, and the true cumulative execution time at that point in time is worked out by adding the term now—swaptime to the element cumtime.

The CPU usage rate measurement unit 428 calculates T1($i$, $q$, RX) in a manner similar to T1($i$, $q$, TX).

Interrupt processing for packet transmission and reception includes hardware (HW) interrupt processing and software (SW) interrupt processing. There are six types of interrupt processing: HI, TX, RX, TIMER, SCSI, and TASKLET.

The CPU usage rate measurement unit 428 measures a total processing time H for interrupt processing including all types of the HW interrupt processing and SW interrupt processing, and a processing time S(k) for each type k (k=HI, TX, RX, TIMER, SCSI, TASKLET) of the SW interrupt processing. H and S(k) are calculated by a method similar to the method for T1($i$, $q$, TX).

The CPU usage rate measurement unit 428 further measures the number of transmission packets N(i, TX) and the number of reception packets N(i, RX) of the AP 451-$i$. Then, the CPU usage rate measurement unit 428 calculates T2($i$, TX) and T2($i$, RX) by the following formulas.

$$T2(i,TX)=(O(TX)+S(TX))(N(i,TX)/\Sigma_i N(i,TX)) \quad (7)$$

$$T2(i,RX)=(O(RX)+S(RX))(N(i,RX)/\Sigma_i N(i,RX)) \quad (8)$$

$$O(k)=(H-\Sigma_k S(k))(S(k)/\Sigma_k S(k)) \quad (9)$$

O(k) represents the processing time for the HW interrupt processing of type k. $\Sigma_i$ in formulas (7) and (8) represents the total sum for i=1 to N, and $\Sigma_k$ in formula (9) represents the total sum for k=HI, TX, RX, TIMER, SCSI, TASKLET.

The CPU usage rate measurement unit 428 calculates C(i, TX) by formula (1) using T1($i$, TX) in formula (3) and T2($i$, TX) in formula (7). Furthermore, the CPU usage rate measurement unit 428 calculates C(i, RX) by formula (2) using T1($i$, RX) in formula (4) and T2($i$, RX) in formula (8).

Next, the CPU usage rate measurement unit 428 corrects C(i) of each AP 451-$i$ by the following formula using a correction value D(i).

$$C(i)=C(i)+D(i) \quad (10)$$

The initial value of D(i) is zero. In interrupt processing relating to packet transmission, when the AP 451-$i$ is the transmission source of the packet and an AP 451-$j$ is interrupted by interrupt processing, the correction value does not need updating if i=j is established. On the other hand, if i≠j is established, the CPU usage rate measurement unit 428 updates D(i) of the AP 451-$i$ and D(j) of the AP 451-$j$ by the following formulas.

$$D(i)=D(i)+U1(i) \quad (11)$$

$$D(j)=D(j)-U1(i) \quad (12)$$

$$U1(i)=T2(i,TX)/(T \cdot N(i,TX)) \quad (13)$$

U1($i$) represents the CPU usage rate related to interrupt processing when one packet is transmitted. Each time a packet is transmitted, U1($i$) is updated by formula (13), D(i) is updated by formula (11), and D(j) is updated by formula (12). This allows the CPU usage rate for interrupt processing for transmission counted for the AP 451-$j$ to be properly counted for the AP 451-$i$.

In interrupt processing relating to packet reception, when the AP 451-$i$ is the transmission destination of the packet and the AP 451-$j$ is interrupted by interrupt processing, the correction value does not need updating if i=j is established. On the other hand, if i≠j is established, the CPU usage rate measurement unit 428 updates D(i) of the AP 451-$i$ and D(j) of the AP 451-$j$ by the following formulas.

$$D(i)=D(i)+U2(i) \quad (14)$$

$$D(j)=D(j)-U2(i) \quad (15)$$

$$U2(i)=T2(i,RX)/(T \cdot N(i,RX)) \quad (16)$$

U2($i$) represents the CPU usage rate related to interrupt processing when one packet is received. Each time a packet is received, U2($i$) is updated by formula (16), D(i) is updated by formula (14), and D(j) is updated by formula (15). This allows the CPU usage rate for interrupt processing for reception counted for the AP 451-$j$ to be properly counted for the AP 451-$i$.

The CPU usage rate measurement unit 428 corrects C(i) of each AP 451-$i$ by formula (10) using D(i) after being updated a predetermined number of times. Then, the CPU usage rate measurement unit 428 records the total CPU usage rate C(i), the transmission CPU usage rate C(i, TX), and the reception CPU usage rate C(i, RX) of each AP 451-$i$ in the statistical information 453.

The flow rate measurement unit 429 measures the number of packets of each AP 451-$i$ input to the transmission packet scheduler 424 per unit time and the number of packets of each AP 451-$i$ output from the transmission packet scheduler 424 per unit time. When the transmission packet scheduler 424 has not throttled or dropped packets, the number of input packets is equal to the number of output packets.

Next, the flow rate measurement unit 429 records the number of packets of each AP 451-$i$ input to the transmission packet scheduler 424 per unit time in the statistical information 453 as a transmission rate (in). Then, the flow rate measurement unit 429 records the number of packets of each AP 451-$i$ output from the transmission packet scheduler 424 per unit time in the statistical information 453 as a transmission rate (out).

Furthermore, the flow rate measurement unit 429 measures the number of packets of each AP 451-$i$ input to the reception packet scheduler 442 per unit time and the number of packets of each AP 451-$i$ output from the reception packet scheduler 442 per unit time. When the reception packet scheduler 442 has not throttled or dropped packets, the number of input packets is equal to the number of output packets.

Next, the flow rate measurement unit 429 records the number of packets of each AP 451-$i$ input to the reception packet scheduler 442 per unit time in the statistical information 453 as a reception rate (in). Then, the flow rate measurement unit 429 records the number of packets of each AP 451-$i$ output from the reception packet scheduler 442 per unit time in the statistical information 453 as a reception rate (out).

FIG. 5 illustrates an example of the QoS information 452 and the statistical information 453. APi (i=1 to N) denotes identification information of the AP 451-$i$. The QoS information 452 in FIG. 5 includes the desired CPU usage rate C1($i$), the desired transmission rate S1($i$), and the desired reception rate R1($i$) of each AP 451-$i$.

The symbol "–" represents that a specific numerical value has not been set by the user. In this case, it is deemed that the user has input a best-effort instruction, and zero is set in C1($i$), S1($i$), or R1($i$).

For example, the desired CPU usage rate C1(1) of the AP 451-1 is 30%, the desired transmission rate S1(2) of the AP 451-2 is 1 Mpps, and the desired reception rate R1(3) of the AP 451-3 is 1 Mpps. For the AP 451-N, the desired CPU usage rate C1(N) is 10%, the desired transmission rate S1(N) is 1 Mpps, and the desired reception rate R1(N) is 1 Mpps.

The statistical information 453 in FIG. 5 includes the total CPU usage rate C(i), the transmission CPU usage rate C(i, TX), the reception CPU usage rate C(i, RX), the transmission rate (in), the reception rate (in), the transmission rate (out), and the reception rate (out) of each AP 451-$i$.

For example, for the AP 451-1, the total CPU usage rate C(1) is 30%, and the transmission CPU usage rate C(1, TX) and the reception CPU usage rate C(1, RX) are 0%. The transmission rate (in), the reception rate (in), the transmission rate (out), and the reception rate (out) of the AP 451-1 are 0 Mpps.

For the AP 451-2, the total CPU usage rate C(2) is 5.9%, the transmission CPU usage rate C(2, TX) is 0.6%, and the reception CPU usage rate C(2, RX) is 0.3%. The transmission rate (in) and the transmission rate (out) of the AP 451-2 are 0.6 Mpps, and the reception rate (in) and the reception rate (out) thereof are 0.3 Mpps.

C(i), C(i, TX), C(i, RX), the transmission rate (in), the reception rate (in), the transmission rate (out), and the reception rate (out) of each AP 451-$i$ are acquired for each of a plurality of past time points.

The flow rate prediction unit 430 uses, for example, the technique of "Efficient Prediction of Network Traffic for Real-Time Applications" to work out a predicted transmission rate S2($i$) and a predicted reception rate R2($i$) of each AP 451-$i$ from the transmission rate (in) and the reception rate (in) included in the statistical information 453, respectively. In this case, the flow rate prediction unit 430 may work out S2($i$) and R2($i$) by any of the following prediction methods.

(a1) The flow rate prediction unit 430 uses the transmission rate (in) as it is as S2($i$) and the reception rate (in) as it is as R2($i$). When S2($i$) and R2($i$) are updated at least at every regular interval, the prediction accuracy is improved by increasing the update frequency.

(a2) The flow rate prediction unit 430 uses a simple average of a predetermined number of past transmission rates (in) as S2($i$) and a simple average of a predetermined number of past reception rates (in) as R2($i$). A weighted average may be used instead of the simple average.

(a3) The flow rate prediction unit 430 works out S2($i$) from the past transmission rates (in) using the double exponential smoothing method and works out R2($i$) from the past reception rates (in) using the double exponential smoothing method. The calculation load of the double exponential smoothing method is relatively light, but the prediction accuracy is high.

The calculation unit 431 works out the transmission rate conversion formula 454 and the reception rate conversion formula 455 of each AP 451-$i$ using the statistical information 453. In the following, the transmission rate conversion formula 454 of each AP 451-$i$ is referred to as f1($i$), and the reception rate conversion formula 455 of each AP 451-$i$ is referred to as f2($i$) in some cases. The calculation unit 431 may work out f1($i$) and f2($i$) by any of the following calculation methods.

(b1) Black Box Approach

The calculation unit 431 works out f1($i$) by interpolation from a relationship between the transmission rate (out) and the transmission CPU usage rate C(i, TX) at each of a plurality of time points. Furthermore, the calculation unit 431 works out f2($i$) by interpolation from a relationship between the reception rate (out) and the reception CPU usage rate C(i, RX) at each of a plurality of time points.

(b2) White Box Approach

The CPU usage rate measurement unit 428 measures the transmission CPU usage rate for each processing route and the reception CPU usage rate for each processing route and records the measured transmission CPU usage rate and reception CPU usage rate in the statistical information 453. The CPU usage rate for each processing route is worked out from the processing time of each processing route. The flow rate measurement unit 429 measures the number of processed transmission packets for each processing route and the number of processed reception packets for each processing route and records the measured number of processed transmission packets and number of processed reception packets in the statistical information 453.

The calculation unit 431 works out an expected value α1 of the CPU usage rate per 1 Mpps from the transmission CPU usage rate and the number of processed transmission packets for each processing route and generates f1($i$) as indicated by the following formula.

$$\text{CPU Usage Rate} = \alpha 1 \cdot \text{Transmission Rate} \quad (21)$$

The calculation unit 431 works out an expected value α2 of the CPU usage rate per 1 Mpps from the reception CPU usage rate and the number of processed reception packets for each processing route and generates f2($i$) as indicated by the following formula.

$$\text{CPU Usage Rate} = \alpha 2 \cdot \text{Reception Rate} \quad (22)$$

The conversion accuracy of f1($i$) and f2($i$) worked out by the white box approach is higher than the conversion accuracy of f1($i$) and f2($i$) worked out by the black box approach.

FIG. 6 illustrates an example of information generated from the statistical information 453. The information generated from the statistical information 453 includes the predicted transmission rate S2($i$), the predicted reception rate R2($i$), the transmission rate conversion formula f1($i$), and the reception rate conversion formula f2($i$).

For example, the predicted transmission rate S2(1) and the predicted reception rate R2(1) of the AP 451-1 are 0 Mpps. For the AP 451-2, the predicted transmission rate S2(2) is 0.6 Mpps, and the predicted reception rate R2(2) is 0.3 Mpps.

The calculation unit 431 divides the target CPU usage rate 456, the target transmission rate 457, and the target reception rate 458 of each AP 451-$i$ into a first part for guaranteeing the QoS information 452 and a second part other than the first part to work out.

In the following, the first part of the target CPU usage rate 456 is referred to as C3($i$), the first part of the target transmission rate 457 is referred to as S3($i$), and the first part of the target reception rate 458 is referred to as R3($i$) in some cases. S3($i$) corresponds to the guaranteed transmission rate, and R3($i$) corresponds to the guaranteed reception rate.

In the following, the second part of the target CPU usage rate 456 is referred to as C4($i$), the second part of the target transmission rate 457 is referred to as S4($i$), and the second part of the target reception rate 458 is referred to as R4($i$) in some cases. C4($i$) is an example of a third usage rate, S4($i$) is an example of an additional transmission rate, and R4($i$) is an example of an additional reception rate. The following formulas hold for S4($i$) and R4($i$).

$$0 \leq S4(i) \leq S2(i) - S1(i) \quad (23)$$

$$0 \leq R4(i) \leq R2(i) - R1(i) \quad (24)$$

First, the calculation unit 431 works out a CPU usage rate f1($i$)[S1($i$)] by converting S1($i$) using f1($i$) and works out a CPU usage rate f2($i$)[R1($i$)] by converting R1($i$) using f2($i$). The reference sign f1($i$)[$x$] represents the CPU usage rate worked by converting the transmission rate x using f1($i$), and the reference sign f2($i$)[$y$] represents the CPU usage rate worked out by converting the reception rate y using f2($i$).

Next, the calculation unit 431 checks whether C1($i$), S1($i$), and R1($i$) satisfy the following formulas.

$$\Sigma_i(C1(i)+f1(i)[S1(i)]+f2(i)[R1(i)]) \leq C\max \quad (25)$$

$$\Sigma_i S1(i) \leq S\max \quad (26)$$

$$\Sigma_i R1(i) \leq R\max \quad (27)$$

Cmax in formula (25) is an example of an allocatable usage rate and represents the maximum value of the CPU usage rate of the CPU 411 that is allocatable. Cmax may be 100%. Smax in formula (26) represents the maximum value of the transmission rate defined from the HW specifications, and Rmax in formula (27) represents the maximum value of the reception rate defined from the HW specifications.

When any of the conditions of formulas (25) to (27) is not satisfied, it is determined that there are not sufficient resources to guarantee the QoS information 452. In this case, since a QoS violation is unavoidable, the calculation unit 431 notifies the user of the resource shortage, and the user takes measures against the resource shortage. The user may modify the QoS information 452 or add resources to the information processing device 301-$p$. The user may also decrease the number of APs 451-$i$ by moving some APs 451-$i$ to another information processing device 301-$p$.

On the other hand, when all the conditions of formulas (25) to (27) are satisfied, it is determined that there are sufficient resources to guarantee the QoS information 452. Thus, the calculation unit 431 calculates C3($i$), S3($i$), and R3($i$) by the following formulas.

$$S3(i)=\min(S1(i),S2(i)) \quad (28)$$

$$R3(i)=\min(R1(i),R2(i)) \quad (29)$$

$$C3(i)=C1(i)+f1(i)[S3(i)]+f2(i)[R3(i)] \quad (30)$$

The element min(a, b) in formulas (28) and (29) represents the minimum values of a and b. The element f1($i$)[S3($i$)] represents the CPU usage rate corresponding to the guaranteed transmission rate S3($i$), and the element f2($i$)[R3($i$)] represents the CPU usage rate corresponds to the guaranteed reception rate R3($i$).

According to formula (30), C3($i$) is calculated including not only the desired CPU usage rate C1($i$) but also the CPU usage rates for guaranteeing the guaranteed transmission rate S3($i$) and the guaranteed reception rate R3($i$). Therefore, the user does not need to estimate the CPU usage rate consumed by network processing for the AP 451-$i$.

According to formula (28), the lower of the desired transmission rate S1($i$) and the predicted transmission rate S2($i$) is set as the guaranteed transmission rate S3($i$). Accordingly, when S2($i$) does not reach S1($i$), f1($i$)[S3($i$)] is calculated based on a transmission rate lower than S1($i$), and thus excessive CPU usage rate allocation is restrained.

According to formula (29), the lower of the desired reception rate R1($i$) and the predicted reception rate R2($i$) is set as the guaranteed reception rate R3($i$). Accordingly, when R2($i$) does not reach R1($i$), f2($i$)[R3($i$)] is calculated based on a reception rate lower than R1($i$), and thus excessive CPU usage rate allocation is restrained.

In this manner, the guaranteed transmission rate, the guaranteed reception rate, and the CPU usage rate for network processing are optimized in accordance with the flow rate of the communication network 302. This allows CPU resources and network resources to be effectively utilized while guaranteeing QoS.

For example, the desired transmission rate S1(2) of the AP 451-2 in FIG. 6 is 1 Mpps, while the predicted transmission rate S2(2) is 0.6 Mpps. In this case, if the guaranteed transmission rate S3(2) is set to at least 0.6 Mpps, no QoS violation will occur.

The desired reception rate R1(3) of the AP 451-3 is 1 Mpps, while the predicted reception rate R2(3) is 1.5 Mpps. In this case, if the guaranteed reception rate R3(3) is set to at least 1 Mpps, no QoS violation will occur.

Next, the calculation unit 431 designates C4($i$) of each AP 451-$i$ by distributing a surplus CPU usage rate CS remaining after excluding the sum of C3($i$) for i=1 to N from Cmax, to the APs 451-1 to 451-N. This allows a higher CPU usage rate than the CPU usage rate that guarantees the QoS information 452 to be allocated to each AP 451-$i$.

At this time, the calculation unit 431 checks whether S2($i$), S3($i$), R2($i$), and R3($i$) satisfy the following formulas.

$$f1(i)[S2(i)-S3(i)]+f2(i)[R2(i)-R3(i)] \leq CS/N \quad (31)$$

$$CS=C\max-\Sigma_i C3(i) \quad (32)$$

In formula (32), $\Sigma_i C3(i)$ is an example of a total usage rate, and CS is an example of a surplus usage rate.

When formula (31) holds for all the AP 451-$i$, the calculation unit 431 sets a best-case target and designates the CS/N as C4($i$).

In this case, the surplus CPU usage rate CS is fairly distributed to the APs 451-1 to 451-N, and since there is no need to limit the flow rate, S4($i$) and R4($i$) are not designated. Accordingly, the target CPU usage rate 456 of each AP 451-$i$ is given as C3($i$)+CS/N, and the target transmission rate 457 and the target reception rate 458 are not set. In this case, since the flow rate is not limited, the transmission rate and the reception rate are improved.

For example, in the case of the AP 451-3 in FIG. 6, S1(3)=0 Mpps, R1(3)=1 Mpps, S2(3)=0.2 Mpps, R2(3)=1.5 Mpps, S3(3)=S1(3)=0 Mpps, R3(3)=R1(3)=1 Mpps are established. Accordingly, the value on the left side of formula (31) is given as f1(3)[0.2 Mpps−0 Mpps]+f2(3)[1.5 Mpps−1 Mpps].

Here, assuming CS/N=10%, formula (31) holds when the value on the left side is 8%. However, when the value on the left side is 15%, formula (31) does not hold, and it is difficult to process all transmissions and receptions of the AP 451-3 unless the other APs 451-$i$ are sacrificed.

When formula (31) does not hold for some of the APs 451-$i$, the calculation unit 431 sets a target other than in the best case. In this case, the calculation unit 431 designates S4($i$) and R4($i$) in accordance with a policy specified by the user. As the user policy, for example, a policy that prioritizes fairness or a policy that prioritizes transmission and reception is used.

In the policy that prioritizes fairness, the fairness in the CPU usage rate between the APs 451-1 to 451-N is prioritized, and the flow rate is immediately limited. When the policy that prioritizes fairness is used, the calculation unit 431 calculates S4($i$) and R4($i$) that satisfy the following formula.

$$f1(i)[S4(i)]+f2(i)[R4(i)] \leq CS/N \quad (33)$$

The element f1($i$)[S4($i$)] is an example of a first additional usage rate, and the element f2($i$)[R4($i$)] is an example of a second additional usage rate. In this case, the calculation unit 431 may work out S4($i$) and R4($i$) by any of the following calculation methods.

(c1) The calculation unit 431 works out a minimum j that satisfies the following formulas.

$$f1(i)[S(i,j)]+f2(i)[R(i,j)] \leq CS/N \quad (34)$$

$$S(i,j)=(S2(i)-S3(i))/2^j \quad (35)$$

$$R(i,j)=(R2(i)-R3(i))/2^j \quad (36)$$

Then, the calculation unit 431 designates S(i, j) as S4($i$) and R(i, j) as R4($i$) using worked-out j. Formula (34) represents a constraint condition for each AP 451-$i$.

(c2) The calculation unit 431 works out S4($i$) and R4($i$) that satisfy the condition of formula (34) and minimize (S2($i$)−S3($i$)−S4($i$))+(R2($i$)−R3($i$)−R4($i$)), by the greedy method, the local search method, or the like.

In the policy that prioritizes transmission and reception, the allocation of the CPU usage rate for network processing is prioritized, and the flow rate limitation is suppressed as much as possible until the overall CPU usage rate reaches Cmax. When the policy that prioritizes transmission and reception is used, the calculation unit 431 works out S4($i$) and R4($i$) that satisfy the following formula and minimize $\Sigma_i((S2(i)-S3(i)-S4(i))+(R2(i)-R3(i)-R4(i)))$, by the greedy method, the local search method, or the like.

$$\Sigma_i(f1(i)[S4(i)]+f2(i)[R4(i)]) \leq CS \quad (37)$$

Formula (37) represents a constraint condition for the APs 451-1 to 451-N. The term $\Sigma_i(f1(i)[S4(i)]+f2(i)[R4(i)])$ is an example of a total additional usage rate.

In cases other than the best case, C4($i$) of each AP 451-$i$ is given as f1($i$)[S4($i$)]+f2($i$)[R4($i$)], and the target CPU usage rate 456 is given as C3($i$)+f1($i$)[S4($i$)]+f2($i$)[R4($i$)]. Furthermore, the target transmission rate 457 is given as S3($i$)+S4($i$), and the target reception rate 458 is given as R3($i$)+R4($i$).

In this case, even if the transmission rate reaches S3($i$), there is a margin of S4($i$) before the flow rate limitation starts, and thus the transmission rate is improved by S4($i$) if the CPU usage rate has an unused portion. Furthermore, even if the reception rate reaches R3($i$), there is a margin of R4($i$) before the flow rate limitation starts, and thus the reception rate is improved by R4($i$) if the CPU usage rate has an unused portion.

FIG. 7 is a flowchart illustrating an example of a target update process performed by the information processing device 301-$p$ in FIG. 4. The target update process in FIG. 7 is repeated, for example, in regular cycles.

First, the acceptance unit 427 checks whether the QoS information 452 has been modified (step 701). When new C1(1), S1($i$), or R1($i$) has been input, it is determined that the QoS information 452 has been modified.

When the QoS information 452 has been modified (step 701, YES), the information processing device 301-$p$ performs a target calculation process (step 704) and performs a target setting process (step 705).

In step 704, the calculation unit 431 calculates the target CPU usage rate 456, the target transmission rate 457, and the target reception rate 458 of each AP 451-$i$. In step 705, the process scheduler 422 acquires the target CPU usage rate 456 from the storage unit 413. In step 705, the transmission packet scheduler 424 acquires the target transmission rate 457 from the storage unit 413, and the reception packet scheduler 442 acquires the target reception rate 458 from the storage unit 413.

On the other hand, when the QoS information 452 has not been modified (step 701, NO), the flow rate measurement unit 429 checks whether a flow rate change has been detected (step 702). At this time, the flow rate measurement unit 429 works out a difference DS between two consecutively measured transmission rates (in) and a difference DR between two consecutively measured reception rates (in). Then, the flow rate measurement unit 429 determines that a flow rate change has been detected when either DS or DR is larger than a threshold value and determines that a flow rate change has not been detected when both of DS and DR are equal to or less than the threshold value.

When a flow rate change has been detected (step 702, YES), the information processing device 301-$p$ performs the processes in step 704 and the subsequent steps. On the other hand, when a flow rate change has not been detected (step 702, NO), the calculation unit 431 checks whether a certain time has elapsed since the target calculation process was performed last time (step 703).

When the certain time has elapsed (step 703, YES), the information processing device 301-$p$ performs the processes in step 704 and the subsequent steps. On the other hand, when the certain time has not elapsed (step 703, NO), the information processing device 301-$p$ ends the process.

Figure 8:
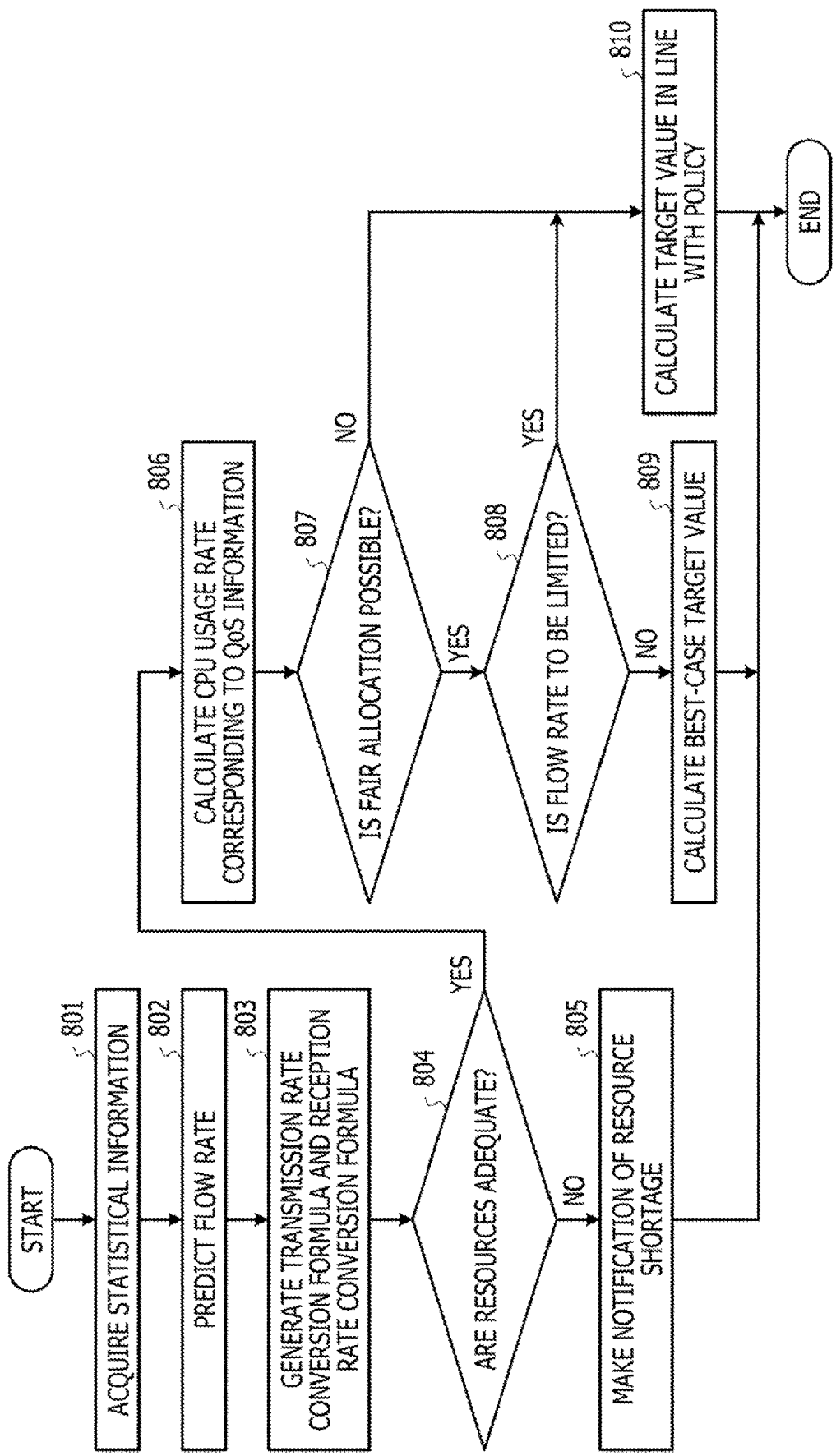
FIG. 8 is a flowchart of a target calculation process.

FIG. 8 is a flowchart illustrating an example of the target calculation process in step 704 in FIG. 7. First, the information processing device 301-$p$ acquires the statistical information 453 (step 801). In step 801, the CPU usage rate measurement unit 428 measures the total CPU usage rate C(i), the transmission CPU usage rate C(i, TX), and the reception CPU usage rate C(i, RX) of each AP 451-$i$. Furthermore, the flow rate measurement unit 429 measures the transmission rate (in), the reception rate (in), the transmission rate (out), and the reception rate (out) of each AP 451-$i$.

Next, the flow rate prediction unit 430 works out the predicted transmission rate S2($i$) and the predicted reception rate R2($i$) from the transmission rate (in) and the reception rate (in) of each AP 451-$i$, respectively (step 802).

Next, the calculation unit 431 works out the transmission rate conversion formula f1($i$) and the reception rate conversion formula f2($i$) of each AP 451-$i$ using the statistical information 453 (step 803). Then, the calculation unit 431 checks whether the resources are adequate (step 804). When there are sufficient resources to guarantee the QoS information 452, it is determined that the resources are adequate.

When the resources are not adequate (step 804, NO), the calculation unit 431 notifies the user of the resource shortage (step 805). On the other hand, when the resources are adequate (step 804, YES), the calculation unit 431 calculates the CPU usage rate corresponding to the QoS information 452 (step 806). In step 806, the calculation unit 431 calculates C3($i$), S3($i$), and R3($i$).

Next, the calculation unit 431 checks whether the CPU usage rate is fairly allocatable (step 807). When formula (31) holds for all the AP 451-$i$, it is determined that the CPU usage rate is fairly allocatable.

When the CPU usage rate is fairly allocatable (step 807, YES), the calculation unit 431 determines whether to apply the flow rate limitation (step 808). When no flow rate limitation is to be applied (step 808, NO), the calculation unit 431 calculates the best-case target value (step 809). In step 809, the calculation unit 431 designates the target CPU usage rate 456 of each AP 451-$i$ as C3($i$)+CS/N.

On the other hand, when the CPU usage rate is not fairly allocatable (step 807, NO), the calculation unit 431 calculates the target value in line with the policy specified by the user (step 810). In step 810, the calculation unit 431 designates the target CPU usage rate 456 of each AP 451-$i$ as C3($i$)+f1($i$)[S4($i$)]+f2($i$)[R4 ($i$)]. Furthermore, the calculation unit 431 designates the target transmission rate 457 as S3(*i*)+S4(*i*) and designates the target reception rate 458 as R3(*i*)+R4(*i*).

When the flow rate limitation is to be applied (step 808, YES), the calculation unit 431 performs the process in step 810.

Figure 9:
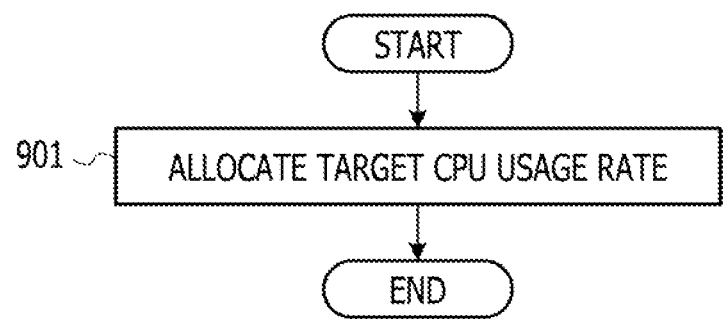
FIG. 9 is a flowchart of a CPU usage rate allocation process.

FIG. 9 is a flowchart illustrating an example of a CPU usage rate allocation process performed by the process scheduler 422. The process scheduler 422 allocates the target CPU usage rate 456 of each AP 451-*i* to each AP 451-*i* (step 901).

In the target CPU usage rate 456 of each AP 451-*i*, the process scheduler 422 may first allocate C3(*i*) to each AP 451-*i* and then allocate C4(*i*) to each AP 451-*i*.

FIG. 10 is a flowchart illustrating an example of a transmission rate control process performed by the transmission packet scheduler 424. First, the transmission packet scheduler 424 locates an AP 451-*i* as a transmission source of the packet input from the packet processing unit 423 (step 1001). Then, the transmission packet scheduler 424 checks whether the target transmission rate 457 is set in the transmission source AP 451-*i* (step 1002).

When the target transmission rate 457 is set (step 1002, YES), the transmission packet scheduler 424 checks whether the transmission rate (in) of the transmission source AP 451-*i* has exceeded the target transmission rate 457 (step 1003). When the transmission rate (in) has exceeded the target transmission rate 457 (step 1003, YES), the transmission packet scheduler 424 drops the packet that has been input (step 1004). The transmission packet scheduler 424 may perform throttling instead of dropping the packet.

On the other hand, when the target transmission rate 457 is not set (step 1002, NO), the transmission packet scheduler 424 outputs the packet that has been input to the packet transmission unit 425 (step 1005). When the transmission rate (in) has not exceeded the target transmission rate 457 (step 1003, NO), the transmission packet scheduler 424 performs the process in step 1005.

FIG. 11 is a flowchart illustrating an example of a reception rate control process performed by the reception packet scheduler 442. First, the reception packet scheduler 442 locates an AP 451-*i* as a transmission destination of the packet input from the packet reception unit 443 (step 1101). Then, the reception packet scheduler 442 checks whether the target reception rate 458 is set in the transmission destination AP 451-*i* (step 1102).

When the target reception rate 458 is set (step 1102, YES), the reception packet scheduler 442 checks whether the reception rate (in) of the transmission destination AP 451-*i* has exceeded the target reception rate 458 (step 1103). When the reception rate (in) has exceeded the target reception rate 458 (step 1103, YES), the reception packet scheduler 442 drops the packet that has been input (step 1104). The reception packet scheduler 442 may perform throttling instead of dropping the packet.

On the other hand, when the target reception rate 458 is not set (step 1102, NO), the reception packet scheduler 442 outputs the packet that has been input to the CPU 411 (step 1105). When the reception rate (in) has not exceeded the target reception rate 458 (step 1103, NO), the reception packet scheduler 442 performs the process in step 1105.

Next, first information processing in which the user estimates the CPU usage rate for network processing to set a target and second information processing in which the calculation unit 431 automatically calculates the CPU usage rate for network processing to set a target are compared referring to FIGS. 12A to 12H.

FIGS. 12A to 12H illustrate an example of the first information processing and the second information processing. The reference sign (A) corresponds to the first information processing, and the reference sign (B) corresponds to the second information processing. In this example, the operation of an aggregation program corresponding to any of the APs 451-1 to 451-N will be described. The aggregation program collects data from another information processing device 301-*p* via the communication network 302 to aggregate the collected data and publicizes the aggregation result to another information processing device 301-*p* via the communication network 302.

Figure 12A:
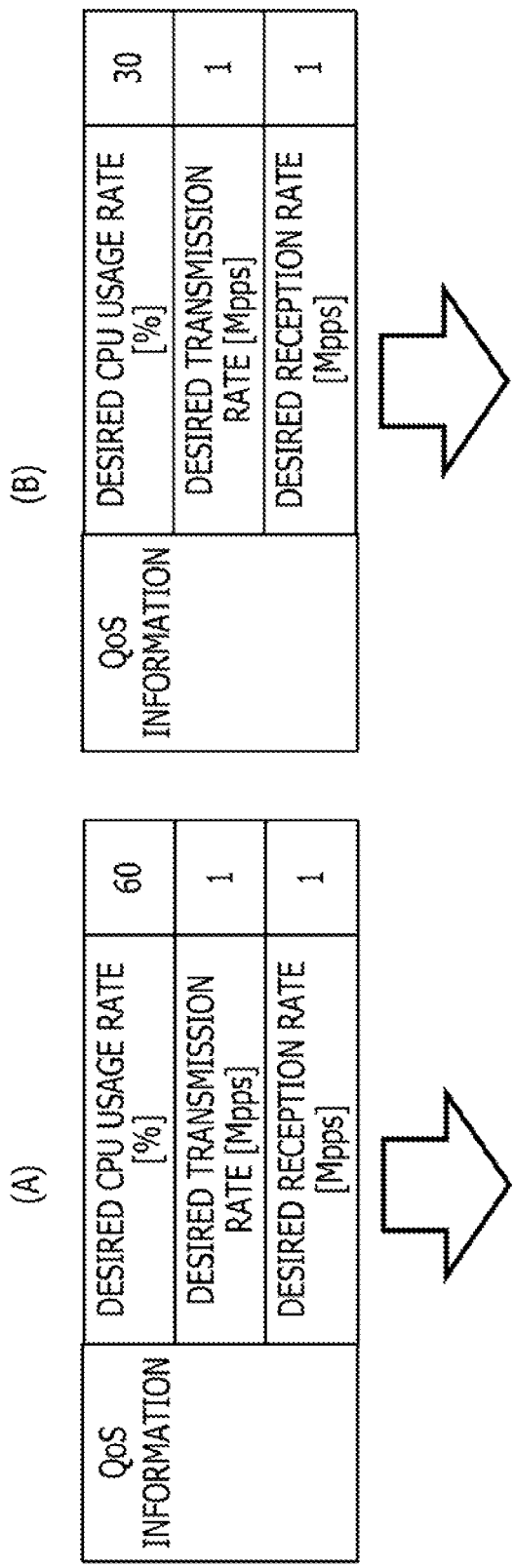
FIG. 12A is a diagram (part 1) illustrating first information processing and second information processing.

FIG. 12A illustrates an example of the QoS information 452 of the aggregation program set by the user. The user sets a reference CPU usage rate ensured for the aggregation program to 30% and sets the desired transmission rate and the desired reception rate for the aggregation program to 1 Mpps.

In the case of (A), the user estimates the transmission CPU usage rate per 1 Mpps to be 10% and estimates the reception CPU usage rate per 1 Mpps to be 20%. Then, 60%, which is the sum of the reference CPU usage rate, the transmission CPU usage rate, and the reception CPU usage rate, is set as the desired CPU usage rate. Moreover, the user sets flow rate limitation that drops a packet when the transmission rate or the reception rate exceeds the desired transmission rate or the desired reception rate.

In this case, if the transmission CPU usage rate or the reception CPU usage rate estimated by the user is higher than the actual CPU usage rate, the aggregation program will occupy the CPU resources in excess.

In the case of (B), the user sets 30% of the reference CPU usage rate as the desired CPU usage rate as it is.

Figure 12B:
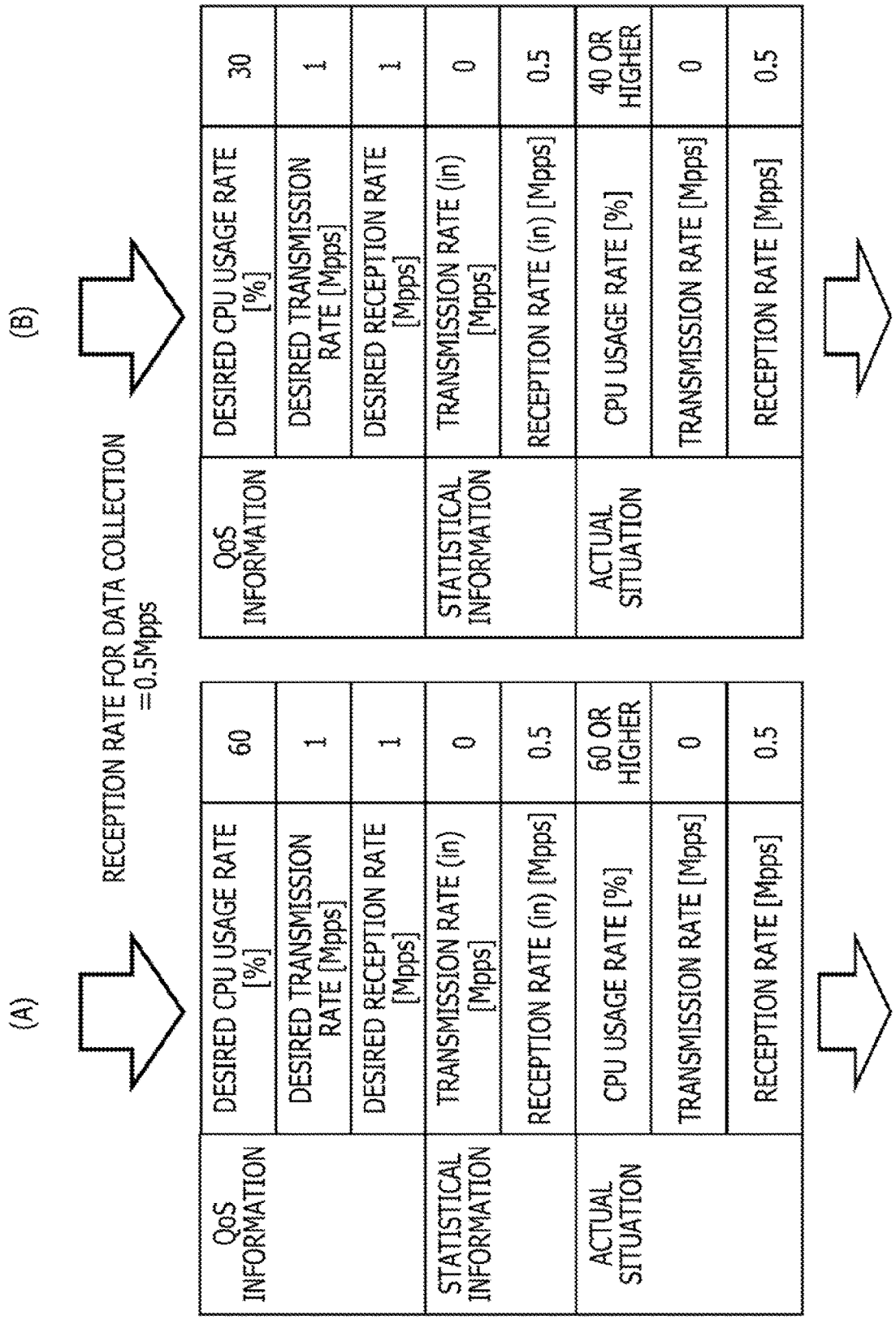
FIG. 12B is a diagram (part 2) illustrating first information processing and second information processing.

FIG. 12B illustrates an example of information processing when the reception rate for data collection by the aggregation program is 0.5 Mpps.

In the case of (A), in the statistical information 453, the transmission rate (in) is 0 Mpps, and the reception rate (in) is 0.5 Mpps. In the actual situation, the CPU usage rate is 60% or higher, the transmission rate is 0 Mpps, and the reception rate is 0.5 Mpps. The value 0.5 Mpps is comparable to half of the desired reception rate.

In this case, 60%, which is the desired CPU usage rate, is allocated to the aggregation program. However, actually, 10%, which is the transmission CPU usage rate estimated with respect to the desired transmission rate, and 10%, which is comparable to half of the reception CPU usage rate estimated with respect to the desired reception rate, are not used. Accordingly, the aggregation program occupies 20% of the CPU resources in excess.

In the case of (B), the statistical information 453 is similar to the case of (A). In the actual situation, the CPU usage rate is 40% or higher, the transmission rate is 0 Mpps, and the reception rate is 0.5 Mpps.

In this case, 30%, which is the desired CPU usage rate, and 10%, which is the CPU usage rate corresponding to the reception rate of 0.5 Mpps, are allocated to the aggregation program. Accordingly, the allocated CPU usage rate is given as 40%, which is reduced by 20% compared to the case of (A). Therefore, an amount saved by the reduced CPU usage rate may be allocated to the other APs 451-*i*.

Figure 12C:
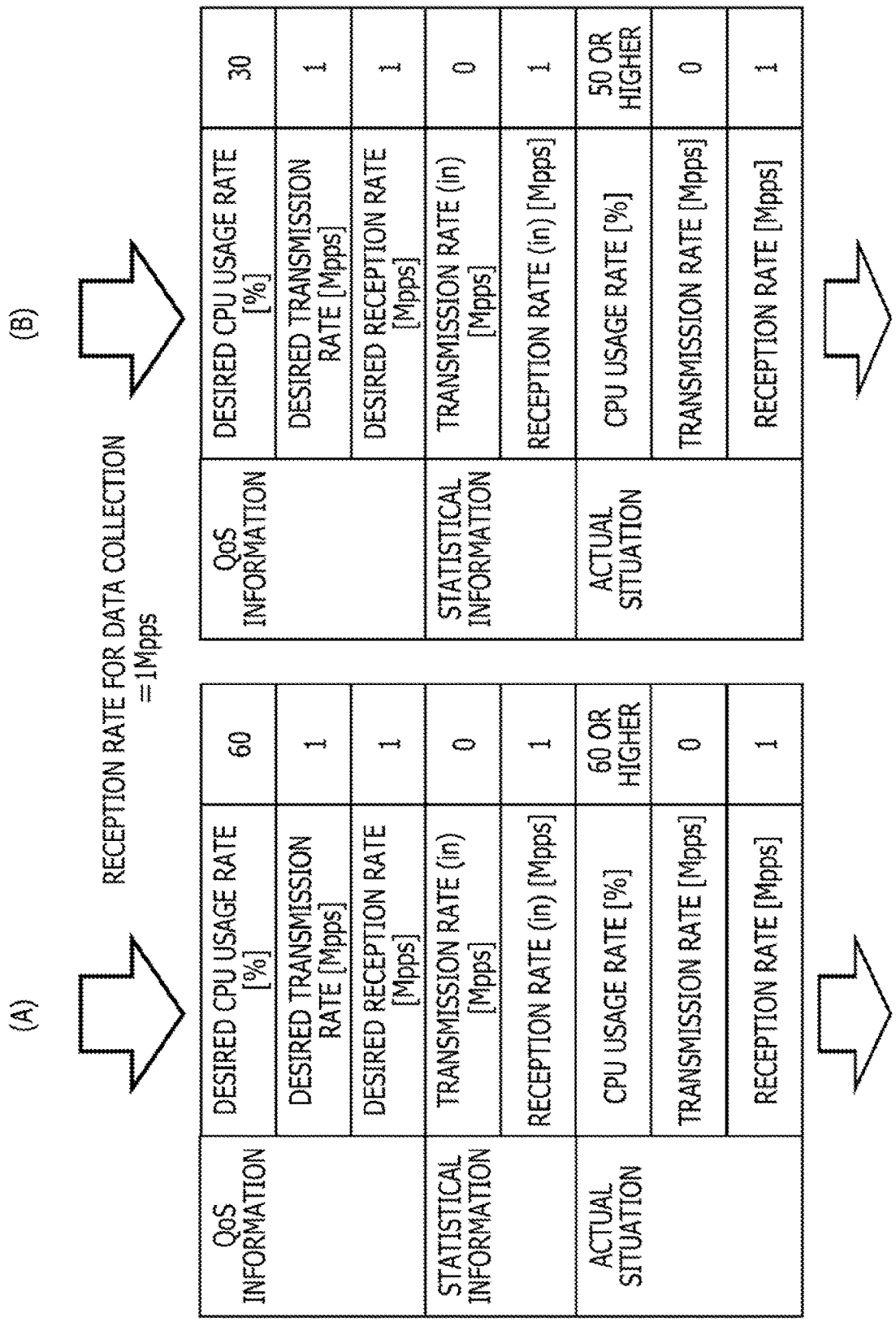
FIG. 12C is a diagram (part 3) illustrating first information processing and second information processing.

FIG. 12C illustrates an example of information processing when the reception rate for data collection by the aggregation program rises to 1 Mpps.

In the case of (A), in the statistical information 453, the transmission rate (in) is 0 Mpps, and the reception rate (in) is 1 Mpps. In the actual situation, the CPU usage rate is 60% or higher, the transmission rate is 0 Mpps, and the reception rate is 1 Mpps. The value 1 Mpps is comparable to the desired reception rate.

In this case, 60%, which is the desired CPU usage rate, is allocated to the aggregation program. However, actually, 10%, which is the transmission CPU usage rate estimated with respect to the desired transmission rate, is not used. Accordingly, the aggregation program occupies 10% of the CPU resources in excess.

In the case of (B), the statistical information 453 is similar to the case of (A). In the actual situation, the CPU usage rate is 50% or higher, the transmission rate is 0 Mpps, and the reception rate is 1 Mpps.

In this case, 30%, which is the desired CPU usage rate, and 20%, which is the CPU usage rate corresponding to the reception rate of 1 Mpps, are allocated to the aggregation program. Accordingly, the allocated CPU usage rate is given as 50%, which is reduced by 10% compared to the case of (A). Therefore, an amount saved by the reduced CPU usage rate may be allocated to the other APs 451-$i$.

FIG. 12D illustrates an example of information processing when the reception rate for data collection by the aggregation program rises to 1.5 Mpps.

In the case of (A), in the statistical information 453, the transmission rate (in) is 0 Mpps, and the reception rate (in) is 1.5 Mpps. In the actual situation, the CPU usage rate is 60% or higher, the transmission rate is 0 Mpps, and the reception rate is 1 Mpps. In this case, since the packet is dropped when the reception rate (in) exceeds 1 Mpps due to the flow rate limitation, the actual reception rate is given as 1 Mpps.

In the case of (B), the statistical information 453 is similar to the case of (A). In the actual situation, the CPU usage rate is 50% or higher, the transmission rate is 0 Mpps, and the reception rate is 1 Mpps or higher. For example, when the best case is achieved, the actual reception rate is given as 1.5 Mpps, and the actual CPU usage rate is given as 60% or higher. In this case, since the actual reception rate increases by 0.5 Mpps compared to the case of (A), unused network resources may be effectively utilized.

Figure 12E:
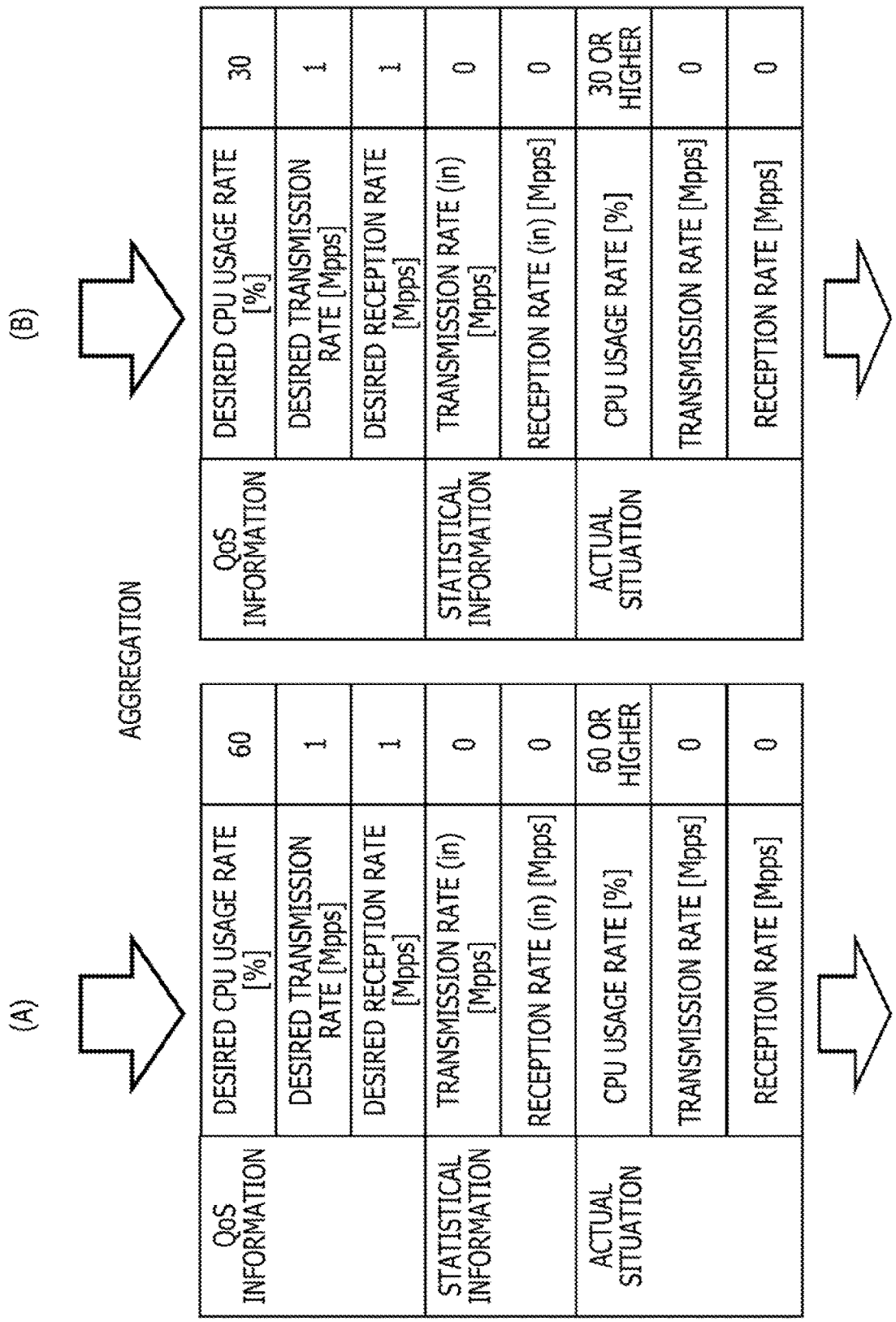
FIG. 12E is a diagram (part 5) illustrating first information processing and second information processing.

FIG. 12E illustrates an example of information processing when data transmission and reception does not occur because the data is being aggregated by the aggregation program.

In the case of (A), in the statistical information 453, the transmission rate (in) and the reception rate (in) are 0 Mpps. In the actual situation, the CPU usage rate is 60% or higher, the transmission rate and the reception rate are 0 Mpps.

In this case, 60%, which is the desired CPU usage rate, is allocated to the aggregation program. However, actually, 10%, which is the transmission CPU usage rate estimated with respect to the desired transmission rate, and 20%, which is the reception CPU usage rate estimated with respect to the desired reception rate, are not used. Accordingly, the aggregation program occupies 30% of the CPU resources in excess.

In the case of (B), the statistical information 453 is similar to the case of (A). In the actual situation, the CPU usage rate is 30% or higher, the transmission rate and the reception rate are 0 Mpps.

In this case, 30%, which is the desired CPU usage rate, is allocated to the aggregation program. Accordingly, the allocated CPU usage rate is reduced by 30% compared to the case of (A). Therefore, an amount saved by the reduced CPU usage rate may be allocated to the other APs 451-$i$.

FIG. 12F illustrates an example of information processing when the transmission rate for publication by the aggregation program is 0.5 Mpps.

In the case of (A), in the statistical information 453, the transmission rate (in) is 0.5 Mpps, and the reception rate (in) is 0 Mpps. In the actual situation, the CPU usage rate is 60% or higher, the transmission rate is 0.5 Mpps, and the reception rate is 0 Mpps. The value 0.5 Mpps is comparable to half of the desired transmission rate.

In this case, 60%, which is the desired CPU usage rate, is allocated to the aggregation program. However, actually, 5%, which is comparable to half of the transmission CPU usage rate estimated with respect to the desired transmission rate, and 20%, which is the reception CPU usage rate estimated with respect to the desired reception rate, are not used. Accordingly, the aggregation program occupies 25% of the CPU resources in excess.

In the case of (B), the statistical information 453 is similar to the case of (A). In the actual situation, the CPU usage rate is 35% or higher, the transmission rate is 0.5 Mpps, and the reception rate is 0 Mpps.

In this case, 30%, which is the desired CPU usage rate, and 5%, which is the CPU usage rate corresponding to the transmission rate of 0.5 Mpps, are allocated to the aggregation program. Accordingly, the allocated CPU usage rate is given as 35%, which is reduced by 25% compared to the case of (A). Therefore, an amount saved by the reduced CPU usage rate may be allocated to the other APs 451-$i$.

Figure 12G:
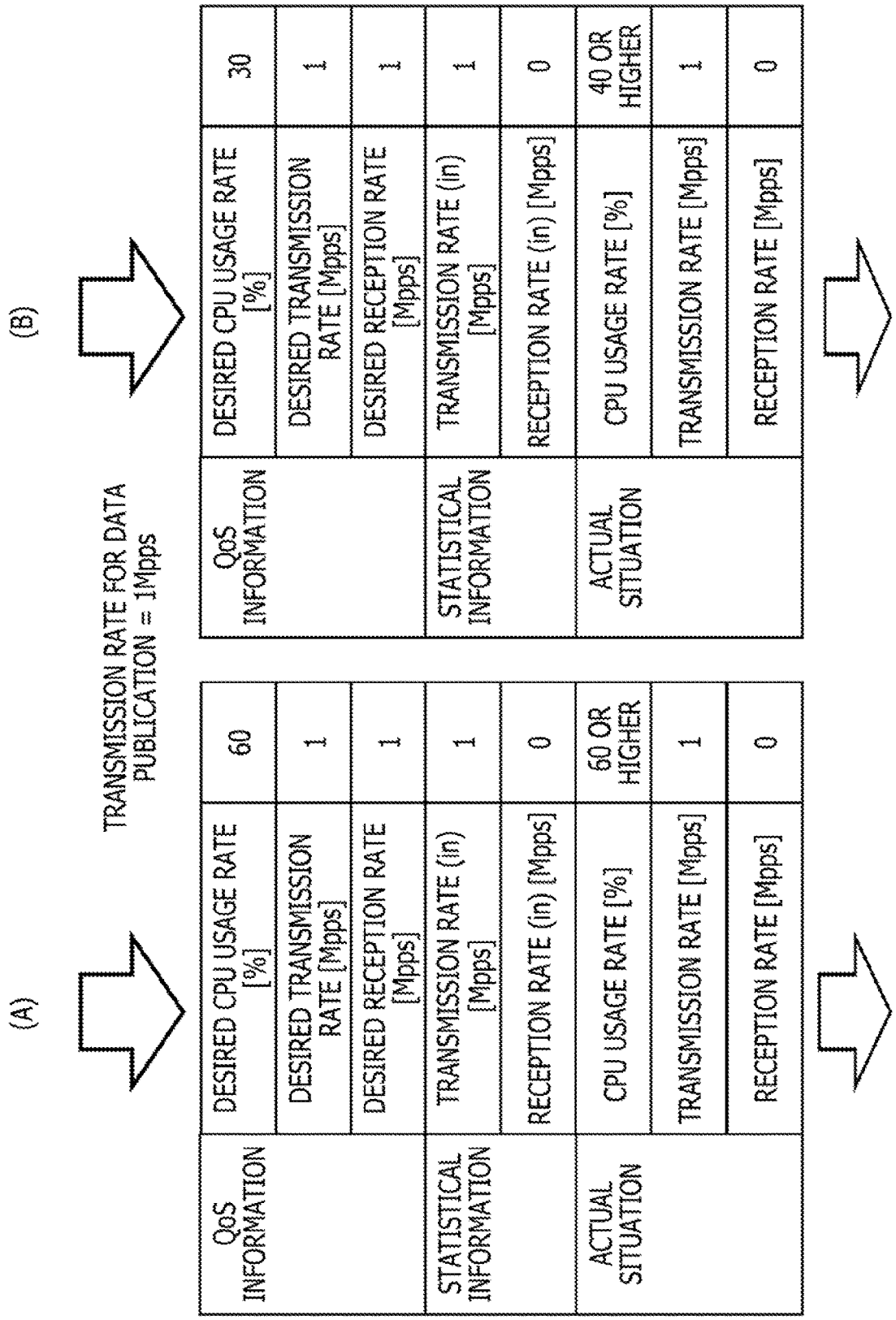
FIG. 12G is a diagram (part 7) illustrating first Information processing and second information processing.

FIG. 12G illustrates an example of information processing when the transmission rate for publication by the aggregation program rises to 1 Mpps.

In the case of (A), in the statistical information 453, the transmission rate (in) is 1 Mpps, and the reception rate (in) is 0 Mpps. In the actual situation, the CPU usage rate is 60% or higher, the transmission rate is 1 Mpps, and the reception rate is 0 Mpps. The value 1 Mpps is comparable to the desired transmission rate.

In this case, 60%, which is the desired CPU usage rate, is allocated to the aggregation program. However, actually, 20%, which is the reception CPU usage rate estimated with respect to the desired reception rate, is not used. Accordingly, the aggregation program occupies 20% of the CPU resources in excess.

In the case of (B), the statistical information 453 is similar to the case of (A). In the actual situation, the CPU usage rate is 40% or higher, the transmission rate is 1 Mpps, and the reception rate is 0 Mpps.

In this case, 30%, which is the desired CPU usage rate, and 10%, which is the CPU usage rate corresponding to the transmission rate of 1 Mpps, are allocated to the aggregation program. Accordingly, the allocated CPU usage rate is given as 40%, which is reduced by 20% compared to the case of (A). Therefore, an amount saved by the reduced CPU usage rate may be allocated to the other APs 451-$i$.

Figure 12H:
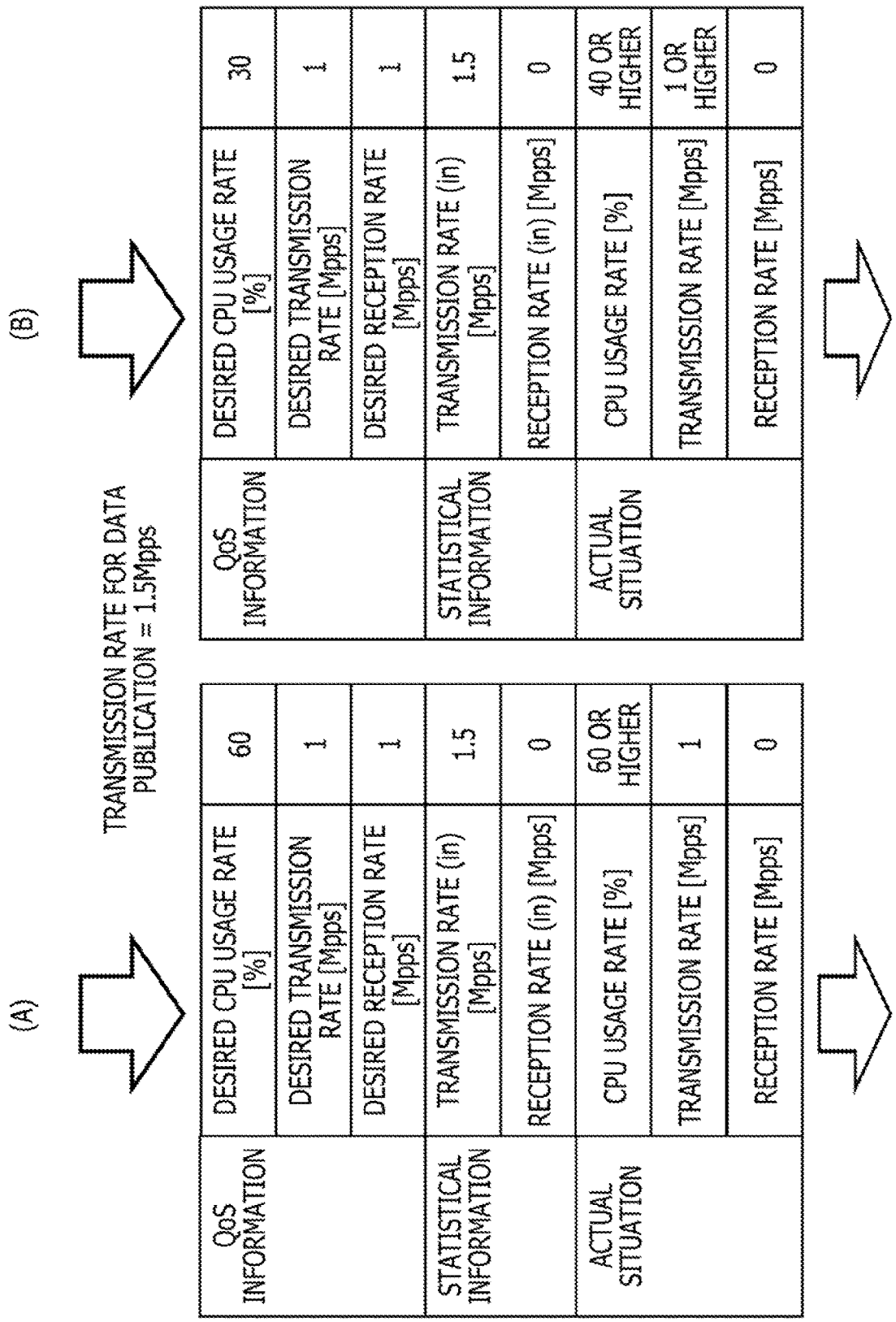
FIG. 12H is a diagram (part 8) illustrating first information processing and second information processing.

FIG. 12H illustrates an example of information processing when the transmission rate for publication by the aggregation program rises to 1.5 Mpps.

In the case of (A), in the statistical information 453, the transmission rate (in) is 1.5 Mpps, and the reception rate (in) is 0 Mpps. In the actual situation, the CPU usage rate is 60% or higher, the transmission rate is 1 Mpps, and the reception rate is 0 Mpps. In this case, since the packet is dropped when the transmission rate (in) exceeds 1 Mpps due to the flow rate limitation, the actual transmission rate is given as 1 Mpps.

In the case of (B), the statistical information 453 is similar to the case of (A). In the actual situation, the CPU usage rate is 40% or higher, the transmission rate is 1 Mpps or higher, and the reception rate is 0 Mpps. For example, when the best case is achieved, the actual transmission rate is given as 1.5 Mpps, and the actual CPU usage rate is given as 45% or higher. In this case, since the actual transmission rate increases by 0.5 Mpps compared to the case of (A), unused network resources may be effectively utilized.

FIG. 13 illustrates an example of third information processing in which the user estimates the CPU usage rate for network processing to set a target for three APs, namely, the APs 451-1 to 451-3. In this example, the user sets the reference CPU usage rate to 20% and sets the reference CPU usage rate as it is as the desired CPU usage rate for the AP 451-1. Then, the user does not set the desired transmission rate or the desired reception rate for the AP 451-1.

Next, the user sets the desired transmission rate and desired reception rate for the AP 451-2 to 1 Mpps and does not set the reference CPU usage rate for the AP 451-2. Then, the user sets the reference CPU usage rate for the AP 451-3 to 20% and sets the desired transmission rate and the desired reception rate for the AP 451-3 to 1 Mpps.

Next, the user estimates the transmission CPU usage rate per 1 Mpps to be 10% and estimates the reception CPU usage rate per 1 Mpps to be 20%. Then, the user sets 30%, which is the sum of the transmission CPU usage rate and the reception CPU usage rate for the AP 451-2, as the desired CPU usage rate for the AP 451-2. Furthermore, the user sets 50%, which is the sum of the reference CPU usage rate, the transmission CPU usage rate, and the reception CPU usage rate for the AP 451-3, as the desired CPU usage rate for the AP 451-3.

Moreover, the user sets flow rate limitation that drops a packet when the transmission rate or the reception rate exceeds the desired transmission rate or the desired reception rate.

In the statistical information 453, the transmission rates (in) of the APs 451-1, 451-2, and 451-3 are 0 Mpps, 0.5 Mpps, and 1.5 Mpps, respectively. The reception rates (in) of the APs 451-1, 451-2, and 451-3 are 0 Mpps, 0.5 Mpps, and 1.5 Mpps, respectively.

In the actual situation, the CPU usage rates of the APs 451-1, 451-2, and 451-3 are 20%, 30%, and 50%, respectively. The transmission rates of the APs 451-1, 451-2, and 451-3 are 0 Mpps, 0.5 Mpps, and 1 Mpps, respectively. The reception rates of the APs 451-1, 451-2, and 451-3 are 0 Mpps, 0.5 Mpps, and 1 Mpps, respectively.

In this case, since the sum of the actual CPU usage rates of the APs 451-1 to 451-3 is 100%, the CPU usage rate has no unused portion. Furthermore, since the packet is dropped when the transmission rate (in) of the AP 451-3 exceeds 1 Mpps due to the flow rate limitation, the actual transmission rate is given as 1 Mpps. Similarly, since the packet is dropped when the reception rate (in) of the AP 451-3 exceeds 1 Mpps due to the flow rate limitation, the actual reception rate is given as 1 Mpps.

FIG. 14 illustrates an example of fourth information processing in which the calculation unit 431 automatically calculates the CPU usage rate for network processing to set a target for the three APs in FIG. 13. The desired CPU usage rate for the AP 451-1 and the desired transmission rates and the desired reception rates for the APs 451-1 to 451-3 are similar to those in FIG. 13.

In this case, the user does not set the desired CPU usage rate for the AP 451-2, but sets 20%, which is the reference CPU usage rate for the AP 451-3, as it is as the desired CPU usage rate for the AP 451-3.

The statistical information 453 is similar to that in FIG. 13. In the actual situation, the CPU usage rates of the APs 451-1, 451-2, and 451-3 are 20% or higher, 15% or higher, and 50% or higher, respectively. The transmission rates of the APs 451-1, 451-2, and 451-3 are 0 Mpps, 0.5 Mpps or higher, and 1 Mpps or higher, respectively. The reception rates of the APs 451-1, 451-2, and 451-3 are 0 Mpps, 0.5 Mpps or higher, and 1 Mpps or higher, respectively.

When the transmission rate (in) is used as $S2(i)$, $S2(1)=0$ Mpps, $S2(2)=0.5$ Mpps, and $S2(3)=1.5$ Mpps are established. When the reception rate (in) is used as $R2(i)$, $R2(1)=0$ Mpps, $R2(2)=0.5$ Mpps, and $R2(3)=1.5$ Mpps are established.

Accordingly, $S3(1)=0$ Mpps, $S3(2)=0.5$ Mpps, and $S3(3)=1$ Mpps are established from formula (28), and $R3(1)=0$ Mpps, $R3(2)=0.5$ Mpps, and $R3(3)=1$ Mpps are established from formula (29). For $f1(1)$ to $f1(3)$, for example, the following formula is generated.

$$\text{CPU Usage Rate}=10\cdot\text{Transmission Rate} \qquad (41)$$

For $f2(1)$ to $f2(3)$, for example, the following formula is generated.

$$\text{CPU Usage Rate}=20\cdot\text{Reception Rate} \qquad (42)$$

From formula (41), $f1(1)[S3(1)]=0\%$, $f1(2)[S3(2)]=5\%$, and $f1(3)[S3(3)]=10\%$ are established. From formula (42), $f2(1)[R3(1)]=0\%$, $f2(2)[R3(2)]=10\%$, and $f2(3)[R3(3)]=20\%$ are established. Accordingly, $C3(1)=20\%$, $C3(2)=15\%$, and $C3(3)=50\%$ are established from formula (30).

Here, assuming that $Cmax=100\%$ is established, $CS=15\%$ and $CS/N=5\%$ are established from formula (32). In this case, since $f1(3)[S2(3)-S3(3)]+f2(3)[R2(3)-R3(3)]=5\%+10\%=15\%$ is established, formula (31) does not hold for the AP 451-3. Thus, the calculation unit 431 sets a target other than in the best case.

For example, when the policy that prioritizes fairness is used, packet transmission and reception that exceeds the processing capacity with a CPU usage rate of 5% are subject to flow rate limitation. In this case, the APs 451-1 to 451-3 are allowed to use the CPU usage rate by adding 5% each.

When the policy that prioritizes transmission and reception is used, 15%, which is the surplus CPU usage rate, is all allocated to the AP 451-3. In this case, the surplus CPU usage rate is not distributed to the APs 451-1 and 451-2, but the AP 451-3 is allowed to transmit and receive all packets without undergoing flow rate limitation.

The configuration of the information processing device 101 in FIG. 1 is merely an example, and some constituent elements may be omitted or modified depending on the use or conditions of the information processing device 101.

The configuration of the information processing system in FIG. 3 is merely an example, and some constituent elements may be omitted or modified depending on the use or conditions of the information processing system. The configuration of the information processing device 301-$p$ in FIG. 4 is merely an example, and some constituent elements may be omitted or modified depending on the use or conditions of the information processing device 301-$p$.

The flowchart in FIG. 2 is merely an example, and some processes may be omitted or modified depending on the configuration or conditions of the information processing device 101.

The flowcharts in FIGS. 7 to 11 are merely examples, and some processes may be omitted or modified depending on the configuration or conditions of the information processing system.

The QoS information 452 and the statistical information 453 illustrated in FIG. 5 are merely examples. The QoS information 452 changes depending on the desired CPU usage rate, the desired transmission rate, and the desired reception rate set by the user, and the statistical information 453 changes depending on processing performed by each AP 451-$i$. The desired transmission rate and the desired reception rate may be set using bandwidth instead of the number of packets per second.

The predicted transmission rate and the predicted reception rate illustrated in FIG. 6 are merely examples, and the predicted transmission rate and the predicted reception rate change depending on the statistical information 453. The information processing illustrated in FIGS. 12A to 12H, 13, and 14 is merely an example, and the statistical information 453 and the actual situations change depending on processing performed by each AP 451-$i$.

Formulas (1) to (42) are merely examples, and the information processing device 301-$p$ may perform information processing using other calculation formulas.

Figure 15:
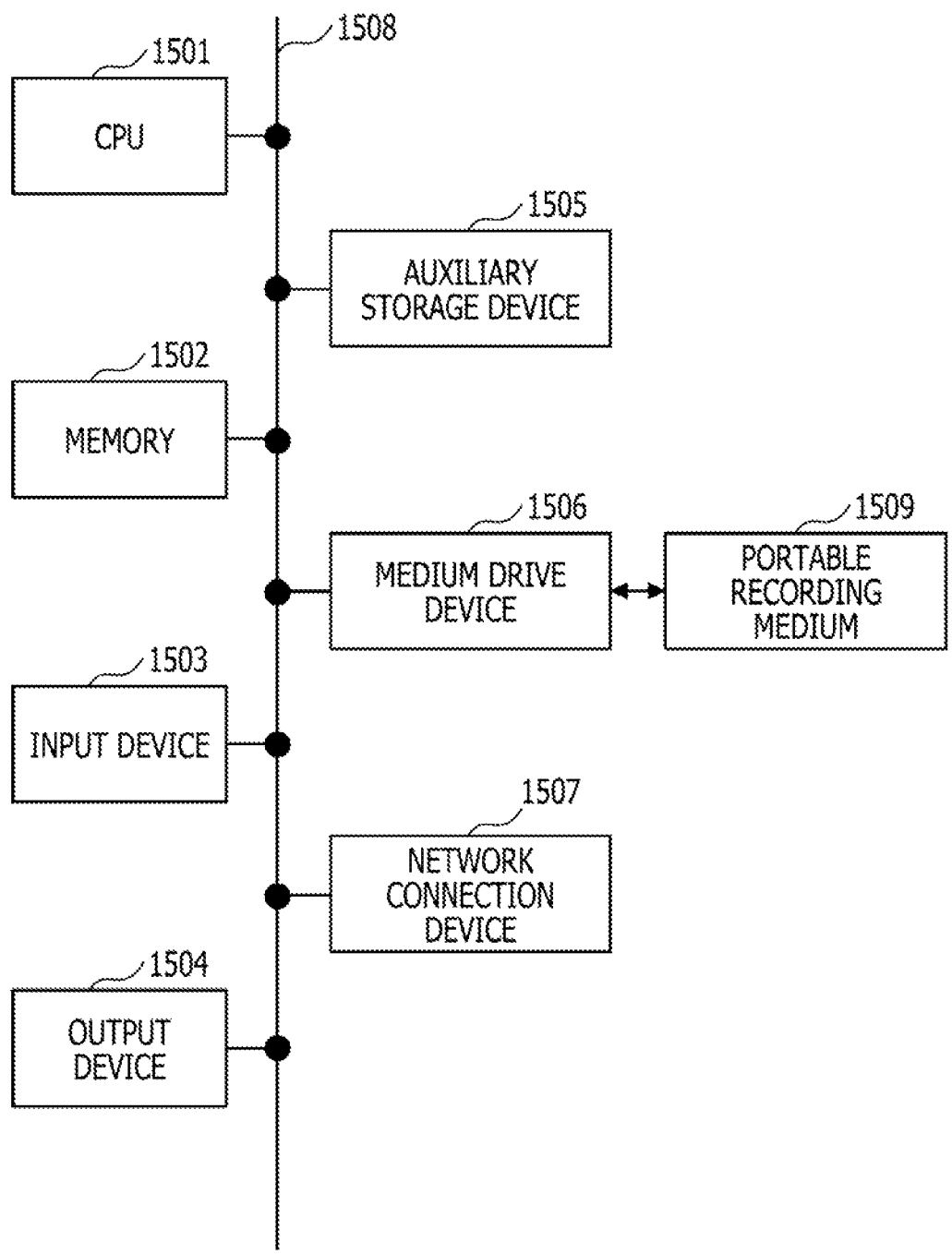
FIG. 15 is a hardware configuration diagram of the information processing device.

FIG. 15 illustrates a hardware configuration example of the information processing device 101 in FIG. 1 and the information processing device 301-$p$ in FIG. 4. The information processing device in FIG. 15 includes a CPU 1501, a memory 1502, an input device 1503, an output device 1504, an auxiliary storage device 1505, a medium drive device 1506, and a network connection device 1507. These constituent elements are hardware and are connected to each other by a bus 1508.

The memory 1502 is, for example, a semiconductor memory such as a read only memory (ROM), a random access memory (RAM), or a flash memory and stores programs and data to be used for processing. The memory 1502 may operate as the storage unit 112 in FIG. 1 or the storage unit 413 in FIG. 4.

For example, the CPU 1501 executes a program using the memory 1502 so as to operate as the acceptance unit 121, the designation unit 122, and the allocation unit 123 in FIG. 1. The CPU 1501 corresponds to the CPU 411 in FIG. 4 and also operates as the execution unit 421, the process scheduler 422, and the packet processing unit 423 in FIG. 4 by executing a program using the memory 1502.

The CPU 1501 also operates as the transmission packet scheduler 424, the packet transmission unit 425, and the packet reception unit 426 in FIG. 4 by executing a program using the memory 1502. The CPU 1501 also operates as the acceptance unit 427, the CPU usage rate measurement unit 428, the flow rate measurement unit 429, the flow rate prediction unit 430, and the calculation unit 431 in FIG. 4 by executing a program using the memory 1502.

For example, the input device 1503 is a keyboard, a pointing device, or the like and is used for inputting instructions or information from a user or an operator. The user can input the desired CPU usage rate, the desired transmission rate, and the desired reception rate to the information processing device using the input device 1503.

For example, the output device 1504 is a display device, a printer, or the like and is used for an inquiry or an instruction to the user or the operator, and outputting a processing result. The processing result may be the result of processing performed by each AP 451-$i$.

For example, the auxiliary storage device 1505 is a magnetic disk device, an optical disk device, a magneto-optical disk device, a tape device, or the like. The auxiliary storage device 1505 may be a hard disk drive or a flash memory. The information processing device may store programs and data in the auxiliary storage device 1505 and load these programs and data into the memory 1502 to use. The auxiliary storage device 1505 may operate as the storage unit 112 in FIG. 1 or the storage unit 413 in FIG. 4.

The medium drive device 1506 drives a portable recording medium 1509 and accesses recorded contents of the portable recording medium 1509. The portable recording medium 1509 is a memory device, a flexible disk, an optical disk, a magneto-optical disk, or the like. The portable recording medium 1509 may be a compact disk read only memory (CD-ROM), a digital versatile disk (DVD), a universal serial bus (USB) memory, or the like. The user or the operator can store the programs and data in the portable recording medium 1509 and can use these programs and data by loading the programs and data into the memory 1502.

As described above, a computer-readable recording medium in which the programs and data used for processing are stored is a physical (non-transitory) recording medium such as the memory 1502, the auxiliary storage device 1505, or the portable recording medium 1509.

The network connection device 1507 is a communication interface circuit that is connected to the communication network 302 and performs data conversion associated with communication. The information processing device can receive programs and data from an external device via the network connection device 1507 and load these programs and data into the memory 1502 to use. The network connection device 1507 may operate as the network interface 412 in FIG. 4.

The network connection device 1507 includes a CPU (not illustrated). The CPU in the network connection device 1507 operates as the packet transmission unit 441, the reception packet scheduler 442, and the packet reception unit 443 in FIG. 4 by executing a program.

Note that the information processing device does not need to include all the constituent elements in FIG. 15, and some constituent elements may be omitted according to the use or conditions of the information processing device. For example, in the case of not using the portable recording medium 1509, the medium drive device 1506 may be omitted.

While the disclosed embodiments and the advantages thereof have been described in detail, those skilled in the art will be able to make various modifications, additions, and omissions without departing from the scope of the embodiments as explicitly set forth in the claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing device comprising:
    an arithmetic processing circuit configured to execute a plurality of programs; and
    a storage circuit configured to store: a first correlation of each of the plurality of programs between a transmission rate of information transmitted by each of the plurality of programs and a usage rate of the arithmetic processing circuit for each of the plurality of programs obtained from statistical information regarding the usage rate, the transmission rate, and a reception rate of information received by each of the plurality of programs; and a second correlation of each of the plurality of programs between the reception rate and the usage rate obtained from the statistical information, wherein the arithmetic processing circuit is configured to perform processing, the processing including:

receiving a desired usage rate for each of the plurality of programs, a desired transmission rate for each of the plurality of programs, and a desired reception rate for each of the plurality of programs;

executing a designation processing that includes
   obtaining a guaranteed transmission rate from the desired transmission rate,
   obtaining a guaranteed reception rate from the desired reception rate,
   converting the guaranteed transmission rate into a first usage rate based on the first correlation,
   converting the guaranteed reception rate into a second usage rate based on the second correlation, and
   designating a target usage rate using the desired usage rate, the first usage rate, and the second usage rate; and executing an allocation processing that includes
   allocating the target usage rate of each of the plurality of programs to each of the plurality of programs.

2. The information processing device according to claim 1, wherein
the processing performed by the arithmetic processing circuit further includes acquiring the statistical information, and
the designation processing is configured to generate the first correlation and the second correlation using the statistical information acquired by the acquisition processing.

3. The information processing device according to claim 1, wherein
the processing performed by the arithmetic processing circuit further includes executing a transmission control processing that controls the transmission rate of the information transmitted by each of the plurality of programs, based on a target transmission rate for each of the plurality of programs,
the information processing device further includes
a reception control circuit configured to control the reception rate of the information received by each of the plurality of programs, based on a target reception rate for each of the plurality of programs, and
the designation processing is configured to designate the target transmission rate and the target reception rate based on the desired usage rate, the first usage rate, the second usage rate, the first correlation, the second correlation, the guaranteed transmission rate, and the guaranteed reception rate.

4. The information processing device according to claim 1, wherein
the designation processing is configured to:
designate a third usage rate for each of the plurality of programs by distributing, to the plurality of programs, a surplus usage rate that remains after excluding a total usage rate obtained by adding the desired usage rate, the first usage rate, and the second usage rate for respective programs of the plurality of programs, from an allocatable usage rate of the arithmetic processing circuit; and designate the target usage rate using the desired usage rate, the first usage rate, the second usage rate, and the third usage rate.

5. The information processing device according to claim 4, wherein
the designation processing is configured to:
designate an additional transmission rate and an additional reception rate such that a total additional usage rate obtained by adding a first additional usage rate obtained by converting the additional transmission rate of each of the plurality of programs based on the first correlation of each of the plurality of programs, and a second additional usage rate obtained by converting the additional reception rate of each of the plurality of programs based on the second correlation of each of the plurality of programs, for respective programs of the plurality of programs is equal to or lower than the surplus usage rate;
designate the target transmission rate using the guaranteed transmission rate and the additional transmission rate; and
designate the target reception rate using the guaranteed reception rate and the additional reception rate.

6. An information processing system comprising
a plurality of information processing devices, wherein
each of the plurality of information processing devices includes:
an arithmetic processing circuit configured to execute a plurality of programs; and
a storage circuit configured to store: a first correlation of each of the plurality of programs between a transmission rate of information transmitted by each of the plurality of programs and a usage rate of the arithmetic processing circuit for each of the plurality of programs obtained from statistical information regarding the usage rate, the transmission rate, and a reception rate of information received by each of the plurality of programs; and a second correlation of each of the plurality of programs between the reception rate and the usage rate obtained from the statistical information, wherein
the arithmetic processing circuit is configured to perform processing, the processing including:
receiving a desired usage rate for each of the plurality of programs, a desired transmission rate for each of the plurality of programs, and a desired reception rate for each of the plurality of programs;
executing a designation processing that includes
   obtaining a guaranteed transmission rate from the desired transmission rate,
   obtaining a guaranteed reception rate from the desired reception rate,
   converting the guaranteed transmission rate into a first usage rate based on the first correlation,
   converting the guaranteed reception rate into a second usage rate based on the second correlation, and
   designating a target usage rate using the desired usage rate, the first usage rate, and the second usage rate; and
executing an allocation processing that includes
   allocating the target usage rate of each of the plurality of programs to each of the plurality of programs.

7. A computer-implemented information processing method comprising:
receiving a desired usage rate for each of a plurality of programs, a desired transmission rate for each of the plurality of programs, and a desired reception rate for each of the plurality of programs;

executing a plurality of programs using an arithmetic processing circuit;
obtaining a guaranteed transmission rate from the desired transmission rate;
obtaining a guaranteed reception rate from the desired reception rate;
converting the guaranteed transmission rate into a first usage rate based on a first correlation of each of the plurality of programs between a transmission rate of information transmitted by each of the plurality of programs and a usage rate of the arithmetic processing circuit for each of the plurality of programs obtained from statistical information regarding the usage rate, the transmission rate, and a reception rate of information received by each of the plurality of programs;
converting the guaranteed reception rate into a second usage rate based on a second correlation of each of the plurality of programs between the reception rate and the usage rate obtained from the statistical information;
designating a target usage rate using the desired usage rate, the first usage rate, and the second usage rate; and
allocating the target usage rate of each of the plurality of programs to each of the plurality of programs.

* * * * *